US008717912B2

(12) United States Patent
Wakabayashi et al.

(10) Patent No.: US 8,717,912 B2
(45) Date of Patent: May 6, 2014

(54) COMMUNICATION QUALITY JUDGMENT METHOD, MOBILE STATION, BASE STATION, AND COMMUNICATIONS SYSTEM

(75) Inventors: Hideji Wakabayashi, Tokyo (JP); Koutarou Sugisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1060 days.

(21) Appl. No.: 11/817,409

(22) PCT Filed: Apr. 20, 2005

(86) PCT No.: PCT/JP2005/007538
§ 371 (c)(1),
(2), (4) Date: Aug. 30, 2007

(87) PCT Pub. No.: WO2006/114873
PCT Pub. Date: Nov. 20, 2006

(65) Prior Publication Data
US 2008/0253300 A1  Oct. 16, 2008

(51) Int. Cl.
*H04L 12/26* (2006.01)
(52) U.S. Cl.
USPC ........................................ 370/252; 455/67.11
(58) Field of Classification Search
None
See application file for complete search history.

(56) References Cited

U.S. PATENT DOCUMENTS

| 6,144,861 | A * | 11/2000 | Sundelin et al. | 455/522 |
| 7,236,787 | B1 * | 6/2007 | Tamura et al. | 455/437 |
| 2002/0077138 | A1 * | 6/2002 | Bark et al. | 455/522 |
| 2007/0270155 | A1 * | 11/2007 | Nelson et al. | 455/452.2 |
| 2008/0123601 | A1 * | 5/2008 | Malladi et al. | 370/335 |
| 2008/0130527 | A1 * | 6/2008 | Huh et al. | 370/280 |
| 2008/0279157 | A1 * | 11/2008 | Cuffaro et al. | 370/336 |

FOREIGN PATENT DOCUMENTS

| EP | 0 978 958 | 2/2000 |
| GB | 2 391 755 | 2/2004 |
| JP | 9 270733 | 10/1997 |
| JP | 2002 198899 | 7/2002 |
| JP | 2003-348007 | 12/2003 |
| JP | 2004 505540 | 2/2004 |

(Continued)

OTHER PUBLICATIONS

"3$^{rd}$ Generation Partnership Project, Technical Specification Group radio Access Network, FDD Enhanced Uplink, overall description, stage 2 (Release 6)", 3GPP TS25.309, V6.2.0, pp. 1-30, (Mar. 2005).

(Continued)

*Primary Examiner* — Rhonda Murphy
(74) *Attorney, Agent, or Firm* — Oblon, Spivak, McClelland, Maier & Neustadt, L.L.P.

(57) ABSTRACT

In order to carry out high-speed packet communications using a large-volume transmission channel like an E-DCH, uplink communication quality must be good. However, in a state in which a link imbalance occurs, a mobile station cannot estimate the uplink communication quality from downlink communication quality. Therefore, the mobile station calculates a path loss from the setting power of a common pilot channel which is notified from a base station, and the received power of the common pilot channel received thereby, and also estimates the received power in the base station on the basis of this path loss. The mobile station further judges the uplink communication quality by estimating the SIR in the base station by using the interference power notified from the base station and the estimated received power.

9 Claims, 15 Drawing Sheets

(56) References Cited

FOREIGN PATENT DOCUMENTS

| JP | 2004 260467 | 9/2004 |
|----|----|----|
| JP | 2005 45316 | 2/2005 |
| WO | 03 037027 | 5/2003 |

OTHER PUBLICATIONS

"RoT information broadcast as auxiliary information for E-DCH scheduling (update of R1-041009)", R1-041070, Agenda item: 7.3 & 7, 4, 3GPP TSG RAN1 #38bis, Seoul, Korea, Sep. 20-24, 2004.

"$3^{rd}$ Generation Partnership Project, Technical Specification Group radio Access Network, FDD Enhanced Uplink, overall description, stage 2 (Release 6)", 3GPP TS 25.309 V6.1.0 (Dec. 2004).

U.S. Appl. No. 11/659,225, filed Feb. 2, 2007, Wakabayashi.

Japanese Office Action issued Apr. 17, 2012 in patent application No. 2009-233323 with English translation.

Japanese Office Action mailed Feb. 12, 2014, in Japanese Patent Application No. 2013-085010.

Siemens, E-DCH AGCH Signalling format, 3GPP TSG-RAN WG2 #46, R2-050514. Scottsdale, USA, Feb. 14-18, 2005.

\* cited by examiner

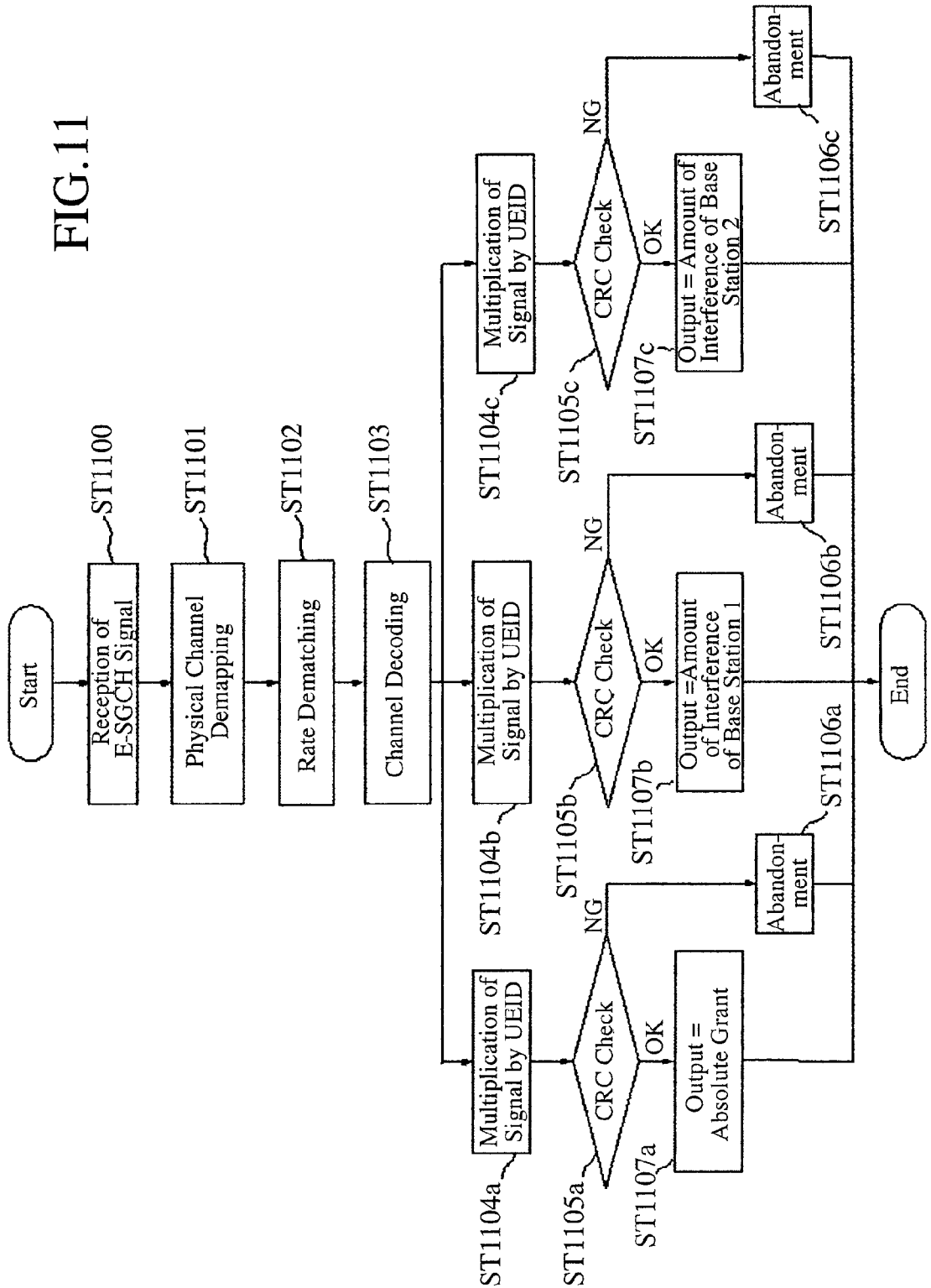

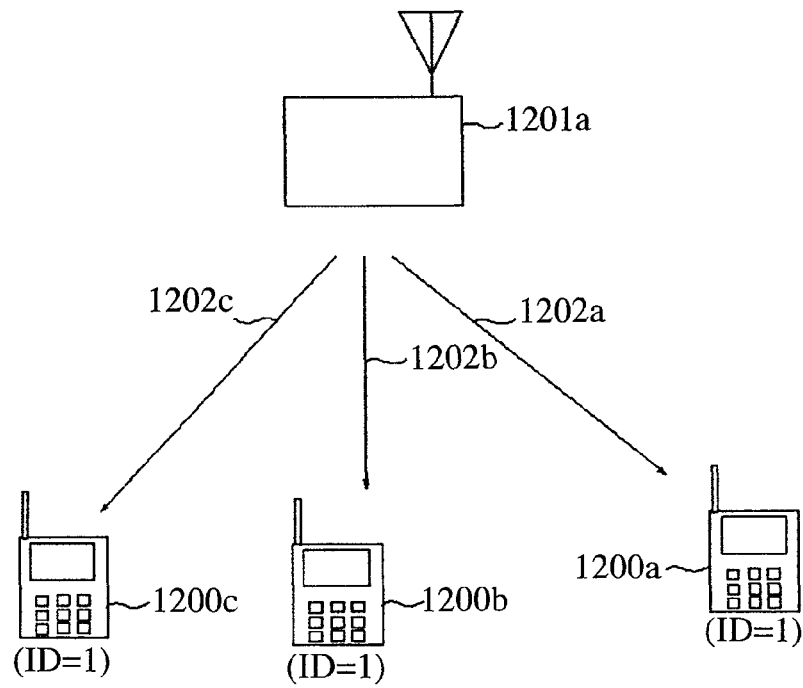
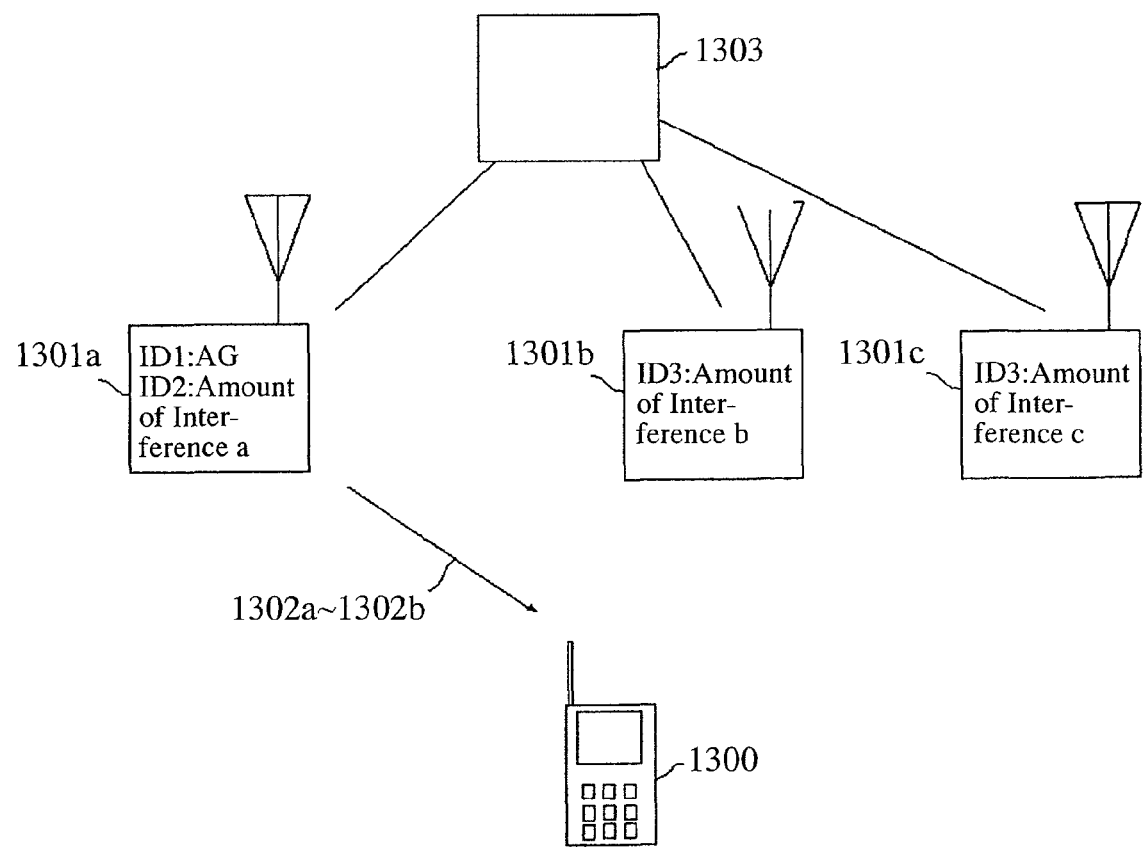

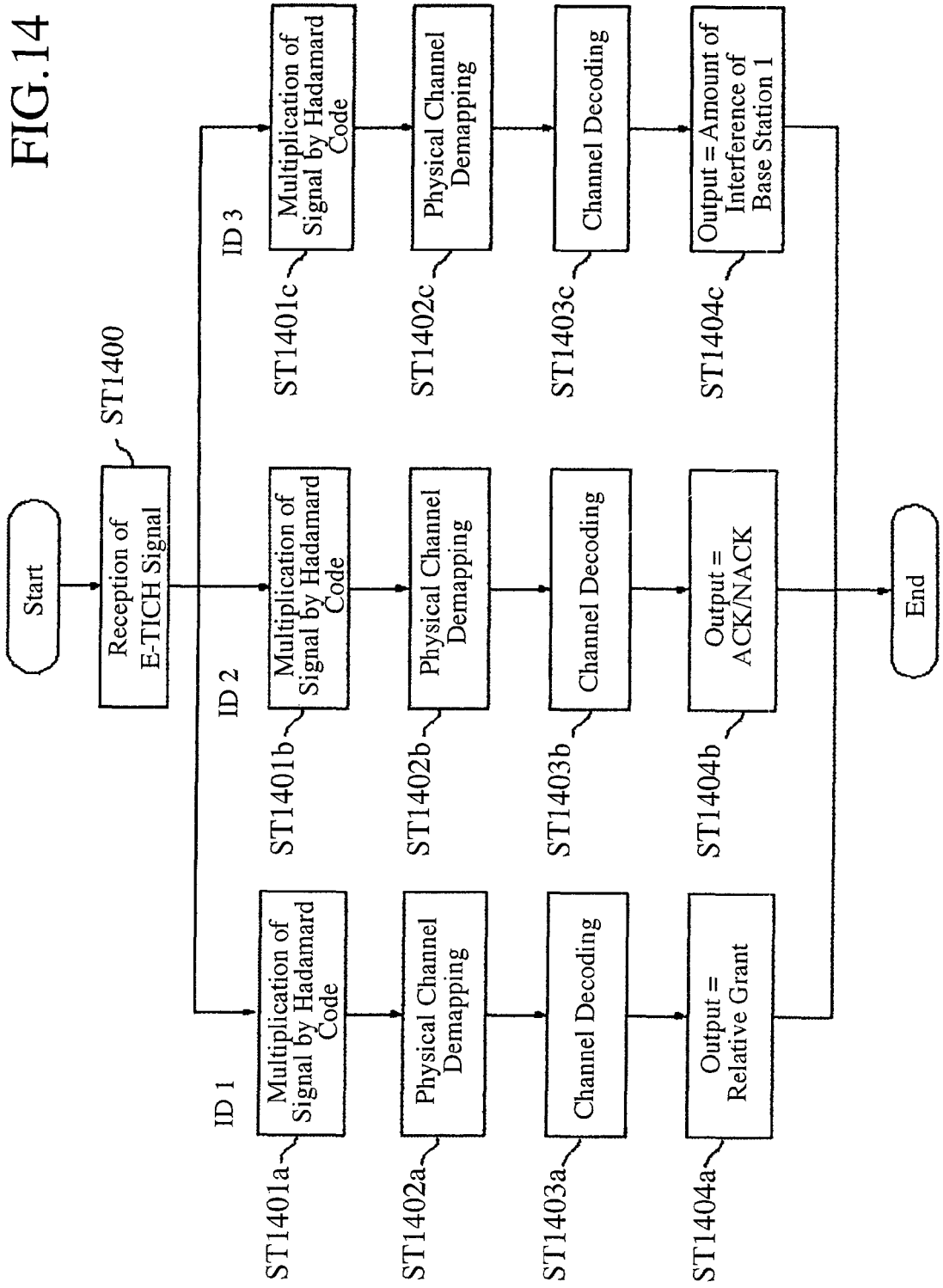

COMMUNICATION QUALITY JUDGMENT METHOD, MOBILE STATION, BASE STATION, AND COMMUNICATIONS SYSTEM

FIELD OF THE INVENTION

The present invention relates to a mobile station which constructs a communications system to which a CDMA (Code Division Multiple Access) method is applied as a communication method. More particularly, it relates to a mobile station which estimates the uplink communication quality at the time of a soft handover.

BACKGROUND OF THE INVENTION

In recent years, plural telecommunications standards called third generation as high-speed CDMA mobile telecommunications methods are adopted as IMT-2000 by the International Telecommunications Union (ITU). According to the W-CDMA (FDD: Frequency Division Duplex) standard which is one of the plural telecommunications standards, commercial services were started in Japan in 2001. For the W-CDMA standard, the standardization organization 3GPP (3rd Generation Partnership Project) determined the first specifications to summarize them as the release 99th edition (Version name: 3.X.x) in 1999. Currently, release 4 and release 5 are specified as new versions of the release 99th edition, and release 6 is being examined and created.

Hereafter, main related channels will be explained below briefly. Physical-layer channels individually assigned to a mobile station as release-99-compliant channels include a DPCCH (Dedicated Physical Control CHannel) and a DPDCH (Dedicated Physical Data CHannel). The DPCCH is a channel via which various pieces of control information in a physical layer (e.g., a pilot signal for synchronization, a transmit-power-control signal, etc.) are transmitted.

The DPDCH is a channel via which various data from a MAC layer (Media Access Control layer: a protocol layer disposed above the physical layer) are transmitted. By the way, a channel used for delivery of data between the MAC layer and the physical layer is called a transport channel (Transport channel). In accordance with the release 99, a transport channel which corresponds to the DPDCH which is a physical-layer channel is called a DCH (Dedicated Channel). The above-mentioned DPCCH and DPDCH are set up for both uplink and downlink directions.

In accordance with the release 5, an HSDPA (High Speed Downlink Packet Access) technology is introduced in order to achieve an improvement in the efficiency of the packet transmission in the downlink, and, as physical-layer channels for the downlink, an HS-PDSCH (High Speed-Physical Downlink Shared CHannel) and an HS-SCCH (High Speed-Shared Control CHannel) are added. The HS-PDSCH and HS-SCCH can be used by two or more mobile stations. The HS-PDSCH is a channel via which data from the MAC layer are transmitted, like the DPDCH which complies with the release 99. The HS-SCCH is a channel via which control information (e.g., a modulation method of modulating the transmission data, the packet data size, etc.) at the time of transmitting data via the HS-PDSCH is transmitted. In accordance with release 5, an HS-DPCCH (High Speed-Dedicated Physical Control CHannel) is added as a physical-layer channel for the uplink. The mobile station transmits a reception judgment result (ACK/NACK) to the data sent thereto via the HS-PDSCH, and downlink radio environment information (CQI: Channel Quality Information) to the base station using the HS-DPCCH.

The release 99 is created by mainly assuming transmission and reception of continuous data like in the case of a voice call. Although an HSDPA which enables downlink high speed packet communications is added in the release 5, no specification assuming uplink high speed packet communications is created but the release 99 specification is applied just as it is. Therefore, also when carrying out burst (Burst) transmission from a mobile station to a base station as in the case of transmitting packet data, dedicated individual channels (DCH and DPDCH) must be always assigned to each mobile station. Therefore, by taking a status in which the demand for uplink packet data transmission is increasing with the proliferation of the Internet into consideration, there arises a problem from the viewpoint of the effective use of radio resources. Therefore, in the release 6, an introduction of an E-DCH (Enhanced DCH) technology is examined in order to implement the effective use of uplink radio resources and high-speed allocation of radio resources. The E-DCH technology may be called HSUPA (High Speed Uplink Packet Access).

In accordance with the E-DCH technology, an AMC (Adaptive Modulation and Coding) technology, an HARQ (Hybrid Automatic Repeat reQuest) technology, etc., which are, in the release 5, introduced with HSDPA, while a short transmission time interval (TTI: Transmission Time Interval) can be used. The E-DCH is a transport channel which is an extension of a DCH which is a transport channel which complies with the conventional standard, and is set up independently of the DCH. In accordance with the release 6, an E-DPDCH (Enhanced-DPDCH) and an E-DPCCH (Enhanced-DPCCH) are added as uplink physical channels for E-DCH. The E-DPDCH and the E-DPCCH are physical channels which correspond to a DPDCH and a DPCCH which comply with a standard prior to the release 5, and the E-DPDCH is a channel via which data from a MAC layer are transmitted and the E-DPCCH is a channel via which control information is transmitted. Furthermore, in the release 6, as downlink physical channels for E-DCH, an E-AGCH (Enhanced-Absolute Grant CHannel) and an E-RGCH (Enhanced-Relative Grant CHannel) via which scheduling results are notified, and an E-HICH (E-DCH HARQ Acknowledgement Indicator CHannel) via which a reception judgment result (ACK/NACK) is notified are added. The communications system as previously explained is disclosed in TS25.309v6.1.0 which is a specification of 3GPP created for E-DCH.

Nonpatent reference 1: 3rd Generation Partnership Project Technical Specification Group Radio Access Network; Feasibility Study for Enhanced Uplink for UTRA FDD (Release 6) 3GPP TS 25.309 V6.1.0 (2004-12)

DISCLOSURE OF THE INVENTION

Problems to be Solved by the Invention

By the way, in order to carry out high-speed packet communications using a large-volume transmission channel like an E-DCH, the uplink communication quality must be good. That is, a mobile station which is carrying out a soft handover and sets up an E-DCH must recognize the uplink communication quality in order to select a base station with good uplink communication quality from among two or more base stations with which the mobile station is communicating. However, in a communications system using a W-CDMA (FDD: Frequency Division Duplex) method in which uplink channels and downlink channels are separated from each other according to their frequencies, the uplink communication quality is not necessarily good even if the downlink communication quality which can be directly grasped by the mobile station is good. Thus, a phenomenon in which a communications malfunction occurs between the base station and the mobile station because of the difference between the uplink communication quality and the downlink communication quality, and therefore the throughput of the whole system degrades is called link imbalance. In a state where a link imbalance occurs, the mobile station cannot estimate the uplink communication quality from the downlink communication quality.

The mobile station can estimate the uplink communication quality on the basis of a TPC (Transmit Power Control) signal transmitted from the base station. The base station calculates an SIR (Signal to Interference Ratio, SIR) from the uplink received power S which it has acquired by measuring the power of a pilot signal of the DPCCH (Dedicated Physical Control Channel) transmitted from the mobile station, and the interference power I of the base station, and generates a TPC signal by comparing this SIR with a target SIR. When determining, as a result of comparing the measured SIR with the target SIR, that the uplink communication quality is better than predetermined communication quality (for example, if the measured SIR>=the target SIR), the base station transmits a TPC command (a Down command) for instructing the mobile station to lower the transmit power to the mobile station. In contrast, when the uplink communication quality is worse than the predetermined communication quality (if the measured SIR<the target SIR), the base station generates a TPC command (the Up command) for instructing the mobile station to raise the transmit power to the mobile station. That is, when the received TPC command is an instruction for lowering the transmit power, the mobile station can determine that the uplink communication quality is good. In contrast with this, when the received TPC command is an instruction for raising the transmit power, the mobile station can estimate that the uplink communication quality is not good for the present.

The power controlling method of measuring the uplink communication quality with SIR and controlling the uplink transmit power by determining whether the measured SIR meets the target SIR, as previously explained, is called "closed loop" (Closed Loop). The closed loop consists of two loops: an "inner loop" (Inner Loop) and an "outer loop" (Outer Loop). The inner loop is the step of measuring the SIR of a signal in which rake (RAKE) synthesis is performed on each slot, and controlling increase or decrease in the transmit power so that this measured SIR value becomes equal to the target SIR value. On the other hand, because the same SIR value does not necessarily mean the same reception quality (BLER: Block Error Rate, BER: Bit Error Rate), the outer loop is the step of measuring the reception quality throughout a long time interval, and correcting the target SIR on the basis of this measured reception quality value.

However, because the TPC command used in the power control of the inner loop consists of 2 bits and no error correction is made to the TPC command, the TPC command itself which the mobile station has received can have an error. That is, a problem is that it is unreliable to estimate the uplink communication quality only by using the TPC command. In addition, when a TPC command for instructing the mobile station which is communicating with two or more base stations to lower the transmit power is transmitted from each of the two or more base stations to the mobile station, the mobile station cannot judge which base station has the best uplink communication quality. It is therefore an object of the present invention to provide a mobile station which can estimate the uplink communication quality with high precision, and a communications system which enables a mobile station to estimate the uplink communication quality with high precision. To be more specific, it is an object of the present invention to provide a mobile station which can calculate a "pseudo SIR" in a base station from the amount of interference and path loss of the base station, and, when setting up an uplink large-volume packet data channel like an E-DCH, can select a base station with the best uplink communication quality.

Means for Solving the Problems

In accordance with the present invention, there is provided a communication quality judgment method including: a path-loss measuring step of determining a path loss from both setting power of a common pilot channel, which is notified from a base station, and received power of the common pilot channel received by a mobile station; an uplink signal received power estimation step of estimating uplink signal received power in the base station from both transmit power which the mobile station transmits and the path loss measured in the path-loss measuring step; and an SIR estimation step of estimating a signal-to-interference ratio in the base station on a basis of both interference power notified from the base station and the uplink signal received power of the base station estimated in the uplink signal received power estimation step.

In accordance with the present invention, there is provided a mobile station including: a transmitting unit for transmitting, via a first data channel, large-volume packet data to a base station, and for transmitting, via a first control channel, control data about this first data channel to the base station; a receiving unit for receiving scheduling information about the first data channel, a result of the base station's judgment of reception of the large-volume packet data via the first data channel, and broadcast information broadcasted from the base station using a broadcast channel; a path-loss measuring unit for measuring a path loss on a basis of a signal received from the base station by the receiving unit received; and a control unit for estimating uplink signal received power in the base station on a basis of both transmit power which the transmitting unit transmits and the path loss measured by the path-loss measuring unit, for calculating a signal-to-interference ratio from both interference power which the receiving unit receives and the estimated uplink signal received power, and for selecting a base station which sets up the first data channel on a basis of the signal-to-interference ratio.

In accordance with the present invention, there is provided a base station including: a receiving unit for receiving, via a first data channel, large-volume packet data from a mobile station, and for receiving, via a first control channel via which control data about the first data channel are transmitted, the control data; an interference power measurement unit for measuring interference power; and a transmitting unit for transmitting scheduling information about the first data channel, a result of judgment of the reception of the first data channel, broadcast information which is broadcasted to the mobile station using a broadcast channel, and interference power measured by the interference power measurement unit.

In accordance with the present invention, there is provided a communications system including: a base station having an uplink receiving unit for receiving, via a first data channel, large-volume packet data transmitted in an uplink direction, and for receiving, via a first control channel via which control data about the first data channel are transmitted, the control data; an interference power measurement unit for measuring interference power; and a downlink signal transmitting unit for transmitting scheduling information about the first data channel, a result of judgment of the reception of the first data channel, broadcast information, and the interference power measured by the interference power measurement unit; and a mobile station having: an uplink signal transmitting unit for transmitting, via the first data channel, the packet data to the base station, and for transmitting, via the first control channel, the control data to the base station; a downlink signal receiving unit for receiving the scheduling information, the reception judgment result, and the broadcast information; a path-loss measuring unit for measuring a path loss on a basis of a signal received from the base station by the downlink signal receiving unit; and a control unit for estimating uplink signal received power in the base station on a basis of both transmit power which the uplink signal transmitting unit transmits and the path loss measured by the path-loss measuring unit, for calculating a signal-to-interference ratio from both the interference power and the uplink signal received power, and for selecting a base station which sets up the first data channel on a basis of the signal-to-interference ratio.

Advantages of the Invention

The communication quality judgment method In accordance with the present invention includes: the path-loss measuring step of determining a path loss from both setting power of a common pilot channel, which is notified from a base station, and received power of the common pilot channel received by a mobile station; the uplink signal received power estimation step of estimating uplink signal received power in the base station from both transmit power which the mobile station transmits and the path loss measured in the path-loss measuring step; and the SIR estimation step of estimating a signal-to-interference ratio in the base station on a basis of both interference power notified from the base station and the uplink signal received power of the base station estimated in the uplink signal received power estimation step. Therefore, the communication quality judgment method offers an advantage of being able to enable the mobile station to recognize the communication quality of the uplink to each base station which is performing a soft handover.

The mobile station in accordance with the present invention includes: the transmitting unit for transmitting, via a first data channel, large-volume packet data to a base station, and for transmitting, via a first control channel, control data about this first data channel to the base station; the receiving unit for receiving scheduling information about the first data channel, a result of the base station's judgment of reception of the large-volume packet data via the first data channel, and broadcast information broadcasted from the base station using a broadcast channel; the path-loss measuring unit for measuring a path loss on a basis of a signal received from the base station by the receiving unit received; and the control unit for estimating uplink signal received power in the base station on a basis of both transmit power which the transmitting unit transmits and the path loss measured by the path-loss measuring unit, for calculating a signal-to-interference ratio from both interference power which the receiving unit receives and the estimated uplink signal received power, and for selecting a base station which sets up the first data channel on a basis of the signal-to-interference ratio. Therefore, the mobile station offers an advantage of being able to recognize the communication quality of the uplink to each base station which is performing a soft handover, and to set up an E-DCH for an appropriate base station which is required to have good uplink communication quality.

The base station in accordance with the present invention includes: the receiving unit for receiving, via a first data channel, large-volume packet data from a mobile station, and for receiving, via a first control channel via which control data about the first data channel are transmitted, the control data; the interference power measurement unit for measuring interference power; and the transmitting unit for transmitting scheduling information about the first data channel, a result of judgment of the reception of the first data channel, broadcast information which is broadcasted to the mobile station using a broadcast channel, and interference power measured by the interference power measurement unit. Therefore, the base station offers an advantage of being able to enable the mobile station to estimate the SIR of the base station.

The communications system in accordance with the present invention includes: a base station having an uplink receiving unit for receiving, via a first data channel, large-volume packet data transmitted in an uplink direction, and for receiving, via a first control channel via which control data about the first data channel are transmitted, the control data; an interference power measurement unit for measuring interference power; and a downlink signal transmitting unit for transmitting scheduling information about the first data channel, a result of judgment of the reception of the first data channel, broadcast information, and the interference power measured by the interference power measurement unit; and a mobile station having: an uplink signal transmitting unit for transmitting, via the first data channel, the packet data to the base station, and for transmitting, via the first control channel, the control data to the base station; a downlink signal receiving unit for receiving the scheduling information, the reception judgment result, and the broadcast information; a path-loss measuring unit for measuring a path loss on a basis of a signal received from the base station-by the downlink signal receiving unit; and a control unit for estimating uplink signal received power in the base station on a basis of both transmit power which the uplink signal transmitting unit transmits and the path loss measured by the path-loss measuring unit, for calculating a signal-to-interference ratio from both the interference power and the uplink signal received power, and for selecting a base station which sets up the first data channel on a basis of the signal-to-interference ratio. Therefore, the communications system offers an advantage of being able to enable the mobile station to recognize the communication quality of the uplink to each base station which is performing a soft handover, and to set up an E-DCH for an appropriate base station which is required to have good uplink communication quality.

BRIEF DESCRIPTION OF THE FIGURES

FIG. 11 is a flow chart explaining a process which is performed by the mobile station when the amount of interference is broadcasted thereto from the base station using an AG;

FIG. 12 is an explanatory diagram showing an outline of a system showing a method of using a group ID;

FIG. 13 is an explanatory diagram for explaining a system which notifies the amount of interference using an AG;

FIG. 14 is a flow chart for explaining a process which is performed by the mobile station when the amount of interference is broadcasted thereto from the base station using an RG;

EXPLANATION OF REFERENCE NUMERALS

100 Mobile station, 101 Base station, 102 Base station control apparatus, 200 DCH,
201 E-DCH, 202 CPICH, 203 BCH, 300 Control unit,
301 Protocol processing unit, 302 DPCH addition/deletion processing unit,
303 DPCH transmitting unit, 304 E-DCH addition/deletion unit,
305 E-DCH transmitting unit, 306 Modulating unit, 307 Power amplifying unit, 308 Antenna,
309 Low noise amplifying unit, 310 Demodulating unit, 311 CPICH receiving unit,
312 Broadcast information receiving unit, 313 Path-loss measuring unit, 314 Base station interference amount management unit,
315 SIR control unit, 316 Calculating unit, 317 Path-loss management unit,
318 Uplink received power management unit, 319 SIR management unit, 320 DPCH receiving unit,
321 New channel receiving unit, 322 Interference amount bit processing unit, 400 Control unit,
401 Protocol processing unit, 402 DPCH addition/deletion processing unit,
403 DPCH transmitting unit, 404 Broadcast information transmitting unit, 405 CPICH transmitting unit,
406 Modulating unit, 407 Power amplifying unit, 408 Antenna,
409 Low noise amplifying unit,
410 Demodulating unit, 411 DPCH receiving unit, 412 E-DCH receiving unit,
413 Interference amount measuring unit, 414 Interference amount notifying unit, 415 New channel transmitting unit, 416 Uplink power controller

PREFERRED EMBODIMENTS OF THE INVENTION

Embodiment 1

Figure 1:
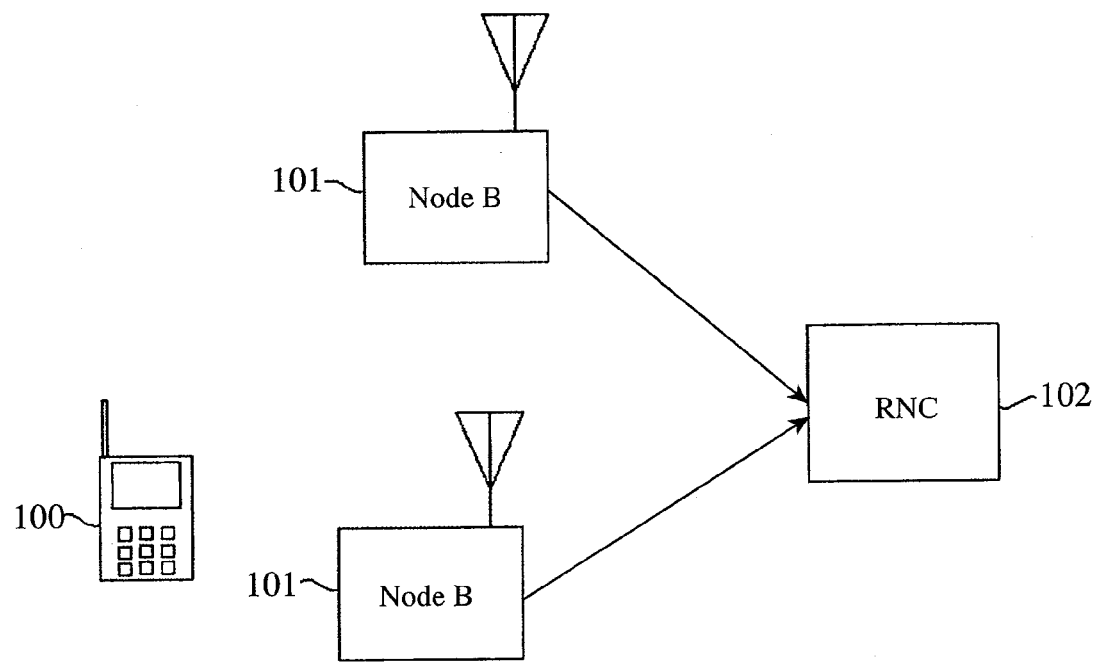
FIG. 1 is an explanatory diagram showing the structure of a mobile communications system.

FIG. 1 is an explanatory diagram showing the structure of a mobile communications system. In FIG. 1, a mobile station (UE: User Equipment) 100 is a moving communications device which the user uses, such as a mobile phone, a Personal Digital Assistant (PDA: Personal Digital Assistant), or a car telephone. The mobile station 100 transmits and receives data to and from a base station 101 via a radio channel. Each base station 101 controls the transmit power of a mobile station, carries out scheduling etc., and carries out a process of allocating a radio resource to the mobile station. A base station control apparatus (RNC: Radio Network Controller) 102 manages two or more base stations (Node Bs) 101, and relays transmission data from a core network (Core Network) not shown in the figure and transmission data from a mobile station. The combination of base stations 101 and the base station control apparatus 102 may be referred to as a UTRAN (Universal Terrestrial Random Access Network).

Figure 2:
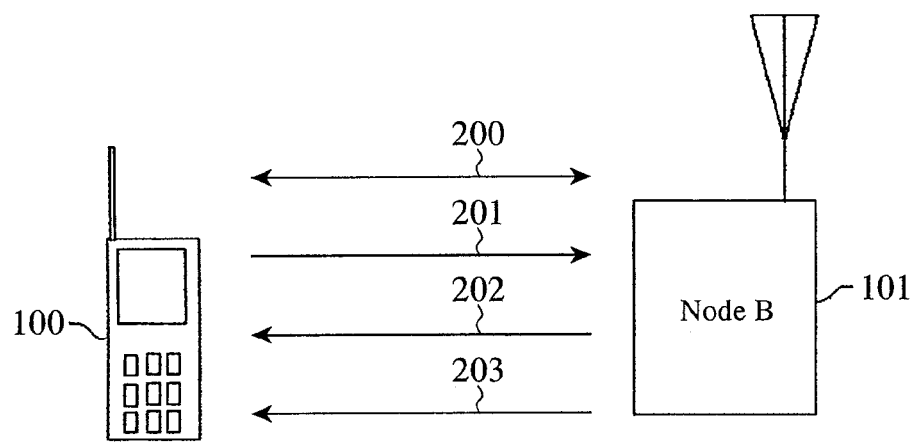
FIG. 2 is an explanatory diagram explaining radio channels between a base station and a mobile station.

FIG. 2 is an explanatory diagram for explaining the radio channels between a base station and a mobile station. In FIG. 2, a dedicated channel (DCH: Dedicated channel) 200 is a channel for transmitting data, and is a channel which is set up for both uplink and downlink directions. To be more specific, the dedicated channel includes two physical channels: a dedicated physical data channel for transmitting user data (DP-DCH: Dedicated Physical Data Channel), and a dedicated physical control channel (DPCCH: Dedicated Physical Control Channel) for transmitting control data. This DCH 200 is defined so as to comply with the specification R99 (Release 1999) of 3GPP (3rd Generation Partnership Project). An enhanced dedicated channel 201 (E-DCH: Enhanced DCH) is a channel disposed in order to transmit large-volume packet data in the uplink direction from the mobile station to the base station, and is set as an uplink channel. The E-DCH also includes two physical channels: an E-DPCCH (a first control channel) for transmitting user data, and an E-DPDCH (a first data channel) for transmitting control data, like the DCH. This E-DCH 201 is defined so as to comply with the specification release 6 (Release 6) of 3GPP.

In FIG. 2, a common pilot channel 202 (CPICH: Common Pilot Channel) is a channel which is used for channel estimation and which is set as a downlink channel. The common pilot channel 202 is a channel which is shared by all mobile stations staying in a predetermined cell, and which is used when the mobile station 100 measures the downlink transmit power. A broadcast channel 203 (BCH: Broadcast Channel) is a channel which is set as a downlink channel, and onto which broadcast information can be piggybacked. The broadcast channel 203 serves as a channel for broadcasting various pieces of control information which the base station control apparatus 102 has set up to the mobile station 100. The broadcast channel 203 is also a channel which is shared by all the mobile stations staying in the predetermined cell.

Figure 3:
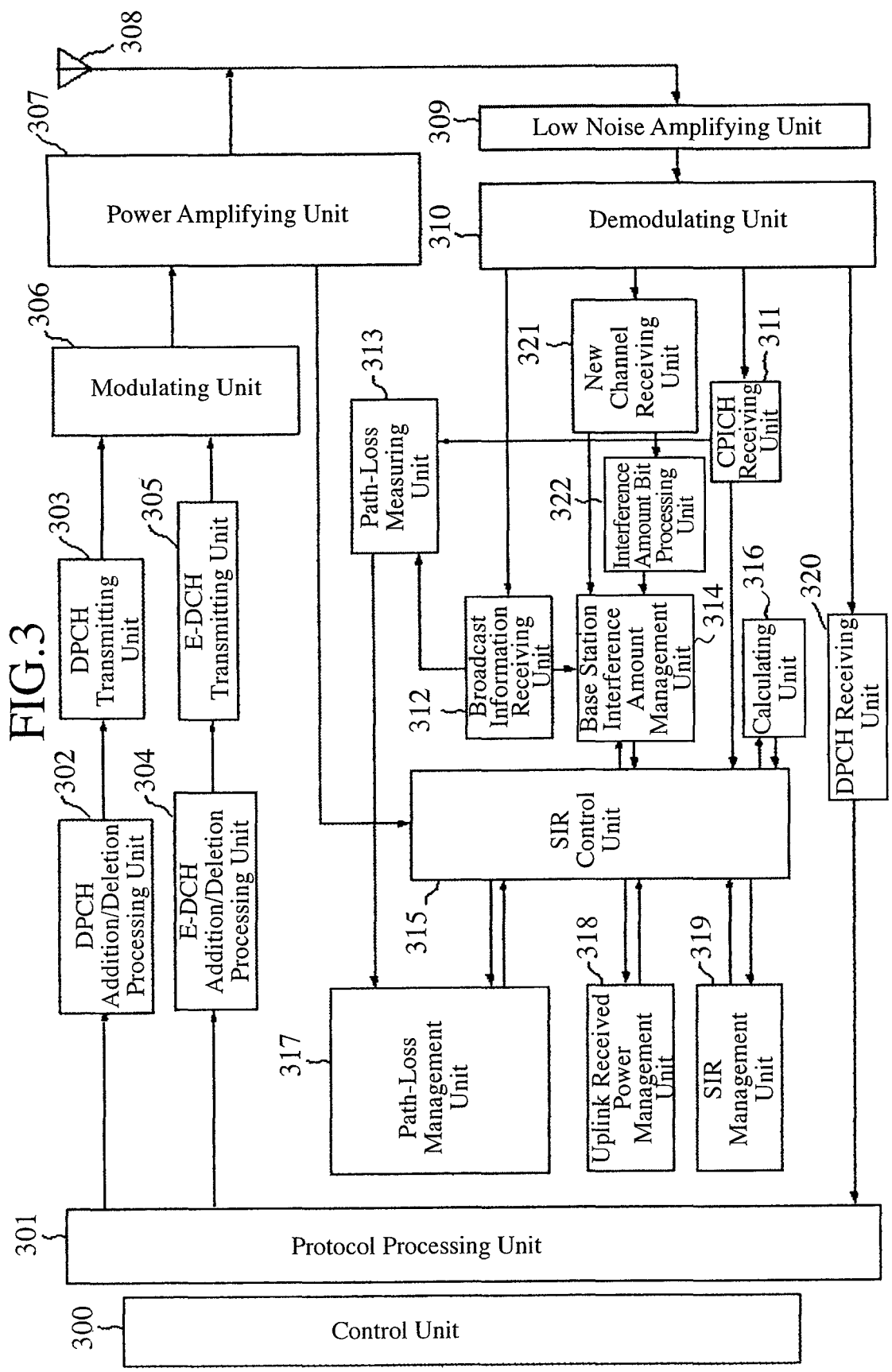
FIG. 3 is a block diagram showing the mobile station in accordance with embodiment 1 of the present invention.

FIG. 3 is a block diagram showing the structure of a mobile station in accordance with embodiment 1 of the present invention. In FIG. 3, a control unit 300 sets up a channel. A protocol processing unit 301 carries out a protocol process of setting up a channel, releasing a channel, etc. A DPCH (Dedicated Physical Channel) addition/deletion unit 302 carries out a setup, addition, or deletion of a DPCH. The DPCH is a generic name for the physical channels of DCH. A DPCH transmitting unit 303 carries out a process for transmitting a DPCH signal, such as a signal showing channel coding. An E-DCH addition/deletion unit 304 carries out a control process of controlling a setup, addition, or deletion of an E-DCH, like the DPCH addition/deletion unit 302. An E-DCH transmitting unit 305 carries out a process for transmitting an E-DCH signal, like the DPCH transmitting unit 303. A modulating unit 306 multiplexes signals, such as a DCH signal and an E-DCH signal, into a signal, and modulates this signal. A power amplifying unit 307 amplifies the modulated signal so that it has desired transmit power. An antenna 308 transmits the radio signal whose transmit power has been amplified to the predetermined transmit power, and also receives a radio signal which has reached from a base station. The above-mentioned components construct a transmitting system included in the mobile station.

In FIG. 3, a low noise amplifying unit 309 amplifies a weak radio signal which the antenna 308 has received. A demodulating unit 310 demodulates the received radio signal so as to demultiplex it into DPCH, CPICH, and BCH signals which are included in the received radio signal, and a CPICH receiving unit 311 processes the CPICH signal separated by the demodulating unit 310. A broadcast information receiving unit 312 processes the BCH signal separated by the demodulating unit 310. A path-loss measuring unit 313 acquires a downlink propagation loss (i.e., a path loss) from the receive level of the CPICH signal. A base station interference amount management unit 314 manages the amount of interference of each base station read by the broadcast information receiving unit 312. An SIR control unit 315 controls calculations required for estimation of an SIR. A calculating unit 316 carries out estimation of an uplink received signal, and a calculation of an SIR. A path-loss management unit 317 manages the path loss of each base station which is measured by the path-loss measuring unit 313. An uplink received power management unit 318 manages the estimated power of the uplink received signal which is acquired by calculation. An SIR management unit 319 manages the SIR acquired by calculation. A DPCH receiving unit (DPDCH/DPCCH reception) 320 processes the DPCH signal demodulated and separated by the demodulating unit 310. A new channel receiving unit 321 receives a signal via a new channel when the new channel which is used in order for a base station to broadcast the amount of interference to the mobile station is set up. The new channel mentioned here is a channel via which the new channel receiving unit receives, for example, an AG (Absolute Grant), an RG (Relative Grant), and an overload identifier (Overload Indicator). The new channel receiving unit can also receive the amount of interference itself using these pieces of information. An interference amount bit processing unit 322 manages bits required to measure the amount of interference. The above-mentioned components construct a receiving system included in the mobile station.

Figure 4:
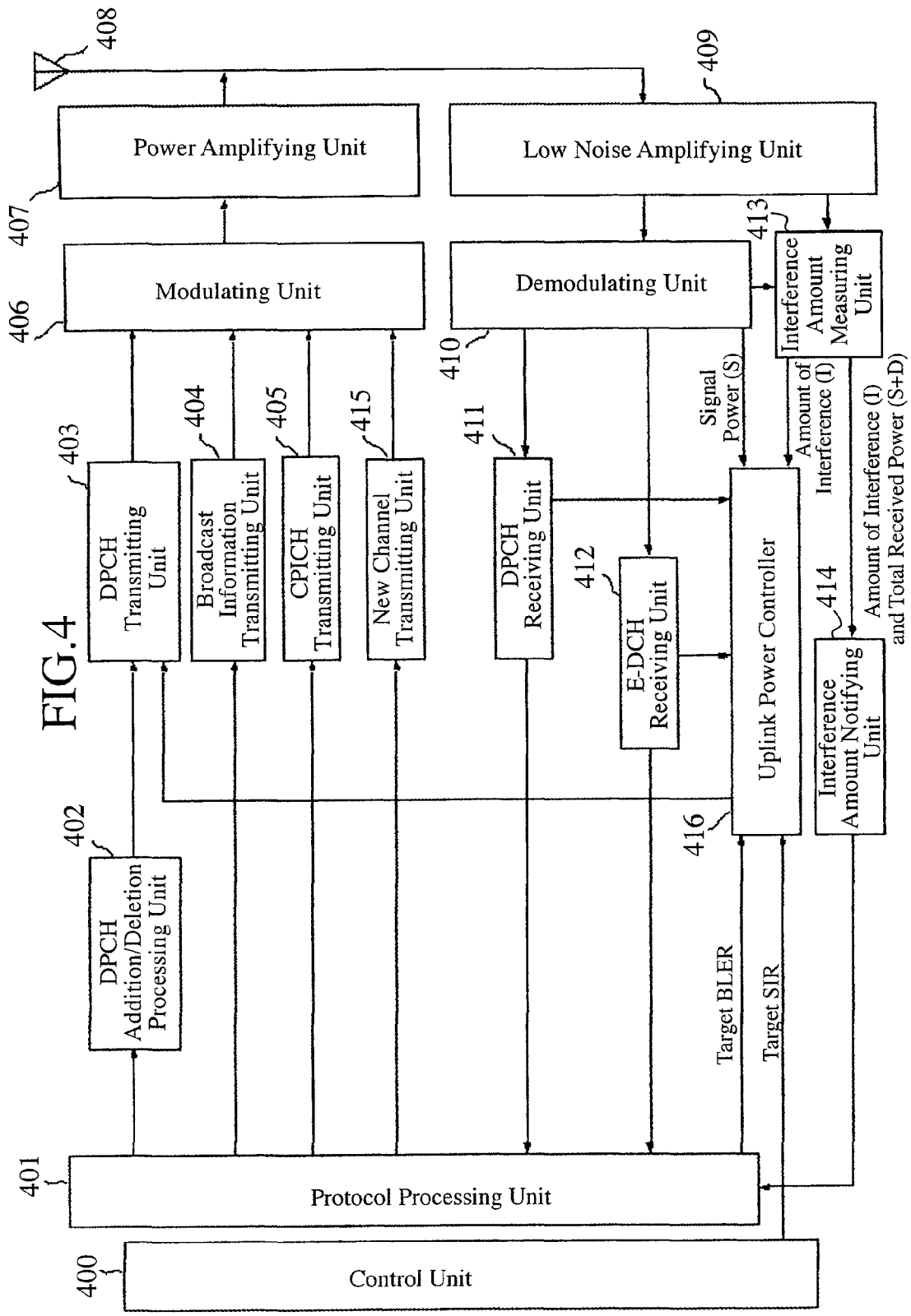
FIG. 4 is a block diagram showing the structure of the base station.

FIG. 4 is a block diagram showing the structure of a base station. In FIG. 4, a control unit 400 sets up a channel. A protocol processing unit 401 carries out a protocol process of setting up a channel, releasing a channel, etc. A DPCH addition/deletion unit 402 carries out a control process of setting up, adding, or deleting a DPCH. A DPCH transmitting unit 403 carries out a process for transmitting a DPCH signal, such as a signal showing channel coding. A broadcast information transmitting unit 404 carries out a process for transmitting a BCH signal, like the DPCH transmitting unit 403. A CPICH transmitting unit 405 carries out a process for transmitting a CPICH signal, like the DPCH transmitting unit 403. A new channel transmitting unit 415 carries out a process for transmitting a signal via a new channel when the new channel for broadcasting the amount of interference is set up. A modulating unit 406 modulates the signals, such as the DCH, BCH, and CPICH signals. A power amplifying unit 407 amplifies the signals so that they have desired transmit power. An antenna 408 transmits or receives a radio signal. On the receive side of the base station, a low noise amplifying unit 409 amplifies a weak radio signal which the antenna 408 has received.

On the basis of a pilot signal, a demodulating unit 410 demodulates the radio signal to generate a DPCH signal, an E-DCH signal, and so on, and then determines signal power (S). A DPCH receiving unit 411 receives the DPCH signal. An E-DCH receiving unit 412 receives the E-DCH signal. Each of the DPCH receiving unit 411 and the E-DCH receiving unit 412 calculates a block error rate (BLER) required for the transmit power control of the uplink. An interference amount measuring unit 413 measures the amount of interference (I) from total received power (S+I) calculated by the low noise amplifying unit 409 and the signal power (S) determined by the demodulating unit 410. An interference amount notifying unit 414 receives either the amount of interference (I) or the total received power (S+I) from the interference amount measuring unit 413, and notifies it to the base station control apparatus. An uplink power controller 416 carries out uplink transmit power control. The uplink power controller carries out the above-mentioned uplink transmit power control from the signal power (S) received from the demodulating unit 410, the amount of interference (I) received from the interference amount measuring unit 413, the block error rates (BLER) received from the DPCH receiving unit 411 and the E-DCH receiving unit 412, the target SIR received, via the control unit 400, from the base station control apparatus, and the target block error rate (BLER) received from the protocol processing unit 401, creates a TPC command, and delivers this command to the DPCH transmitting unit 403.

Figure 5:
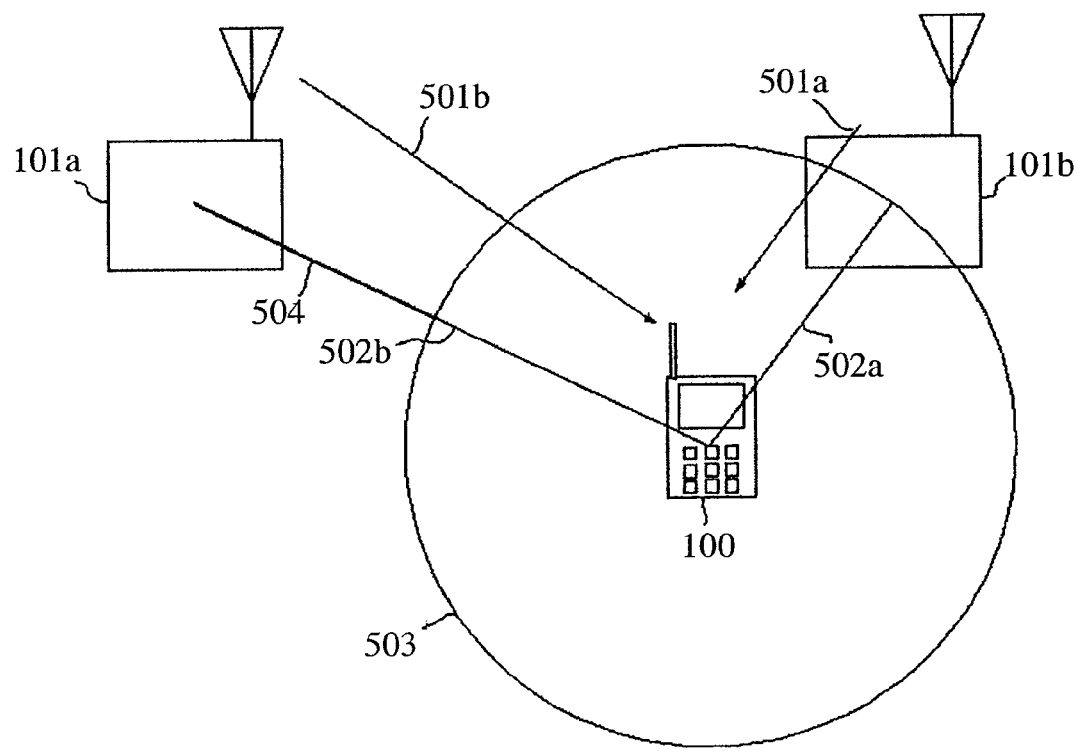
FIG. 5 is an explanatory diagram for explaining an outline of estimation of an uplink SIR by the mobile station.

FIG. 5 is an explanatory diagram for explaining an outline of the mobile station's estimation of the uplink SIR. FIG. 5 shows a method of, when a mobile station 100 is performing a soft handover with two or more base stations 101*a* and 101*b*, estimating an equivalent of the uplink SIR in the mobile station 100 on the basis of the amount of interference broadcasted from each of the two or more base stations 101*a* and 101*b*, and the path loss between the mobile station 100 and each of the base stations 101*a* and 101*b*. The mobile station 100 receives the amounts of interference broadcasted thereto using the BCHs 501*a* and 501*b* from the base stations 101*a* and 101*b*. Because the amount of interference changes for every base station due to factors, such as a traffic amount in the cell, it is broadcasted from each base station to the mobile station. This amount of interference corresponds to I. The mobile station 100 measures the path loss with each of the base stations 101*a* and 101*b*. In FIG. 5, the path loss 502*a* between the mobile station 100 and the base station 101*b* is defined as a reference path loss, and a distance at which a path loss which is much the same level as this reference path loss is measured is referred to as the same path-loss distance 503. The difference between the path loss 502*b* between the base station 101*a* and the mobile station 100 and the path loss 502*a* (i.e., the reference path loss) between the base station 101*b* and the mobile station 100 is a path-loss difference 504. The mobile station 100 calculates the path loss and the equivalent of the SIR (i.e., a pseudo SIR).

Figure 6:
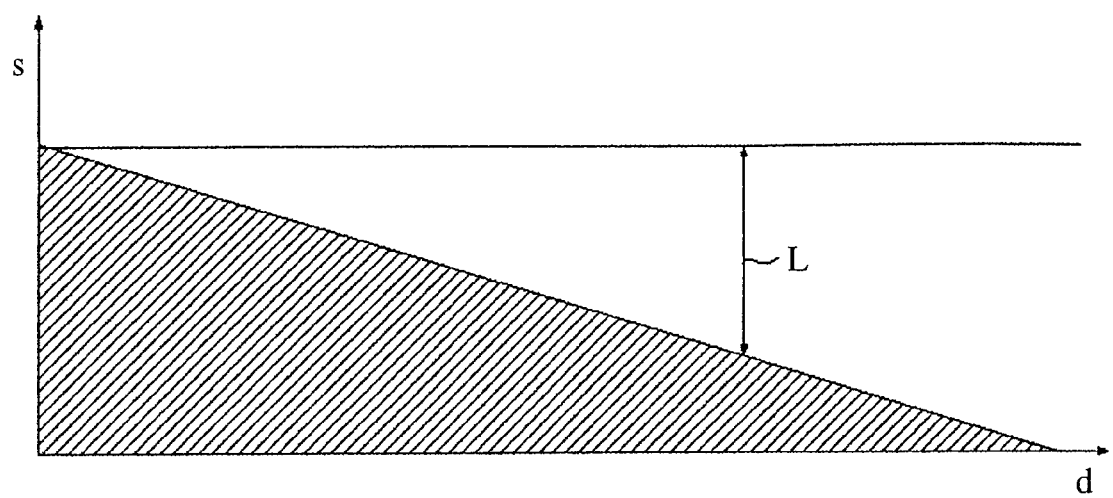
FIG. 6 is an explanatory diagram for explaining an outline of a path loss.

The path loss and the amount of interference will be explained hereafter. FIG. 6 is an explanatory diagram for explaining an outline of the path loss. In FIG. 6, S is the receiving intensity of signals which the mobile station (or a base station) has received. For example, a base station calculates it by averaging the received power of an uplink signal from the mobile station during a long time interval. d is the distance between the mobile station and the base station, and L is the path loss and is equivalent to the magnitude of attenuation of the receiving intensity which occurs in the communication path. For high-speed fading, when the received power in the base station of an uplink transmission signal from the mobile station is averaged during a long time interval, the receiving intensity S decreases in proportion to the distance d, as shown in FIG. 6. The path loss can be acquired by calculating the difference between the setting power of the CPICH (Common Pilot Channel) which is set up by the base station control apparatus, and the received power of the CPICH which is measured by the mobile station.

Figure 7:
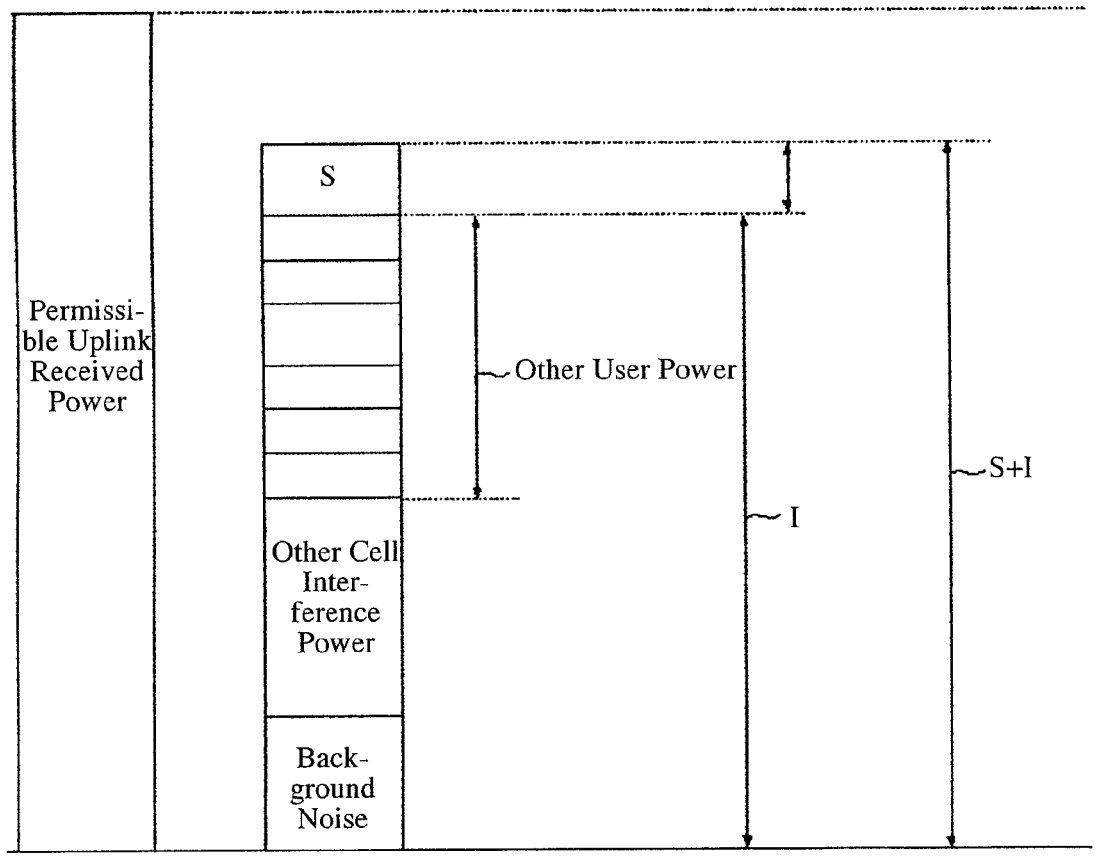
FIG. 7 is an explanatory diagram for explaining an outline of an amount of interference.

FIG. 7 is an explanatory diagram for explaining an outline of the amount of interference (interference power). In FIG. 7, "S" denotes its own signal power (i.e., the signal power of the mobile station 100), and is equivalent to S at the time when calculating the SIR. "I" denotes the power which becomes the interference in the local station, and is the power which is obtained by subtracting the signal power S of the local station from the total power which the base station has received. "Permissible uplink received power" is maximum power which the base station can receive, and the base station cannot receive power exceeding this maximum power. "Background noise" includes a noise, such as a thermal noise of the antenna. "Other cell interference power" is the amount of interference from other base stations. "Other user power" is the sum of the powers of other mobile stations which exist in the same cell other than the local station. That is, the interference I is the sum of the background noise, the other cell interference power, and the other user power. Because the amount of uplink interference cannot be grasped by the mobile station, it is broadcasted to the mobile station from the base station. Although the original amount of interference is equivalent to I which is the sum of the background noise, the other cell interference power, and the other user power, it is desirable that the original amount of interference is not information specific to each mobile station, but information which is shared by all mobile stations which exist in the same cell because, in accordance with this embodiment, it is broadcasted to each mobile station using a common channel, such as a BCH. Therefore, the base station broadcasts the total received power S+I which it acquires by adding the power of the local station to the amount I of interference to the mobile station. If the power S of the local station is not so large, each mobile station can consider that the total received power S+I broadcasted thereto from the base station is the interference power to the local station.

Figure 8:
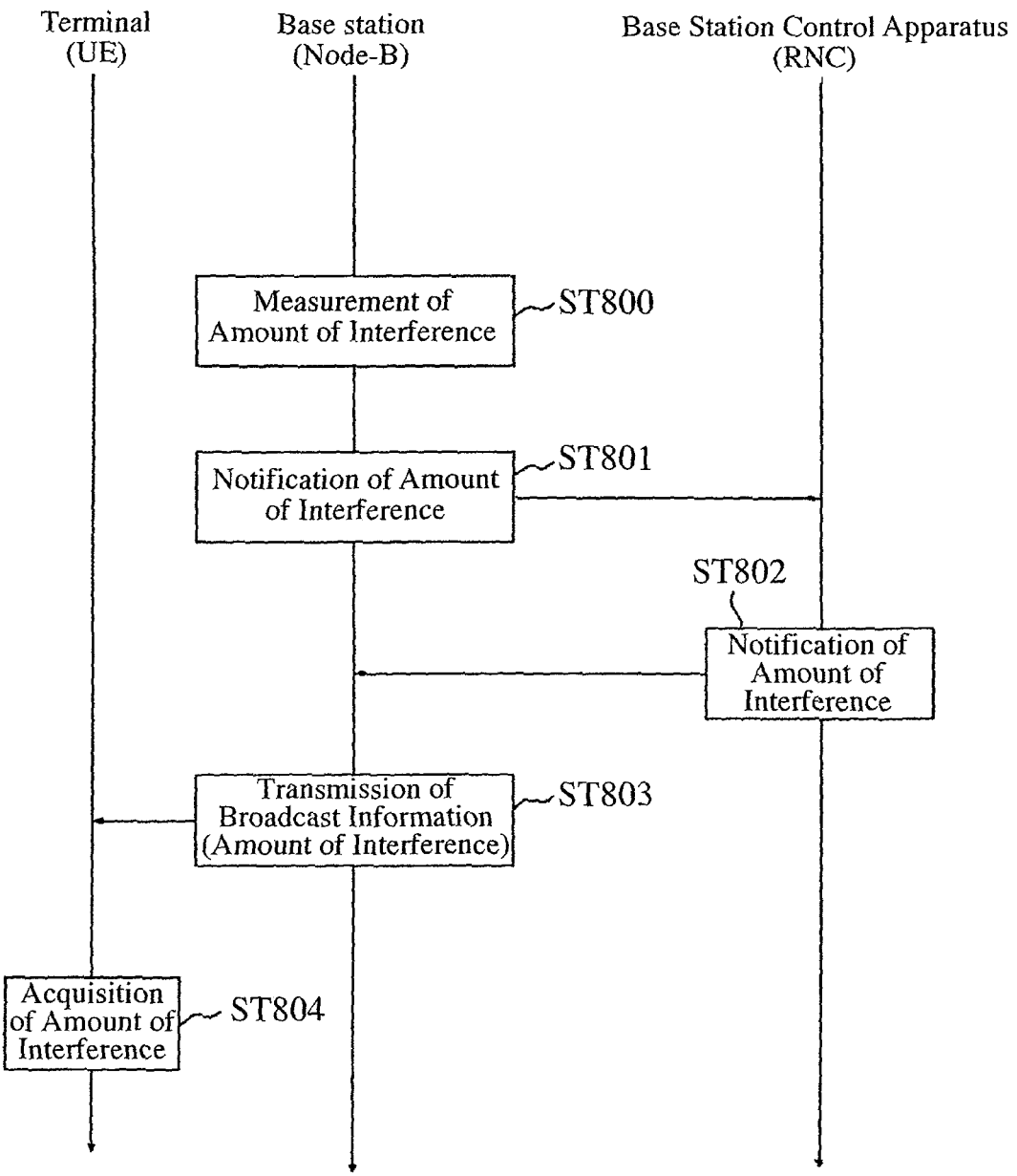
FIG. 8 is an explanatory diagram for explaining a process of broadcasting the amount of interference from a base station to a mobile station.

In accordance with this embodiment 1, the amount of interference is broadcasted from the broadcast information transmitting unit 404 of each base station to the mobile station using the BCH. FIG. 8 is an explanatory diagram for explaining a process of broadcasting the amount of interference from each base station to the mobile station. In FIG. 8, each base station measures the amount of interference in the cell by using the interference amount measuring unit 413 (step 800), and notifies it to the base station control apparatus (step 801). The amount of interference is the total received power (S+I shown in FIG. 7) including the power of the mobile station itself which is the target. The base station control apparatus notifies the amount of interference notified from each base station to the base station (step 802). Each base station transmits the amount of interference, as broadcast information, to all the mobile stations which exist in the cell by using the broadcast information transmitting unit 404 (step 803). The mobile station receives the BCH signal to read the amount of interference from the signal, and stores it in the interference amount management unit 314.

Figure 9:
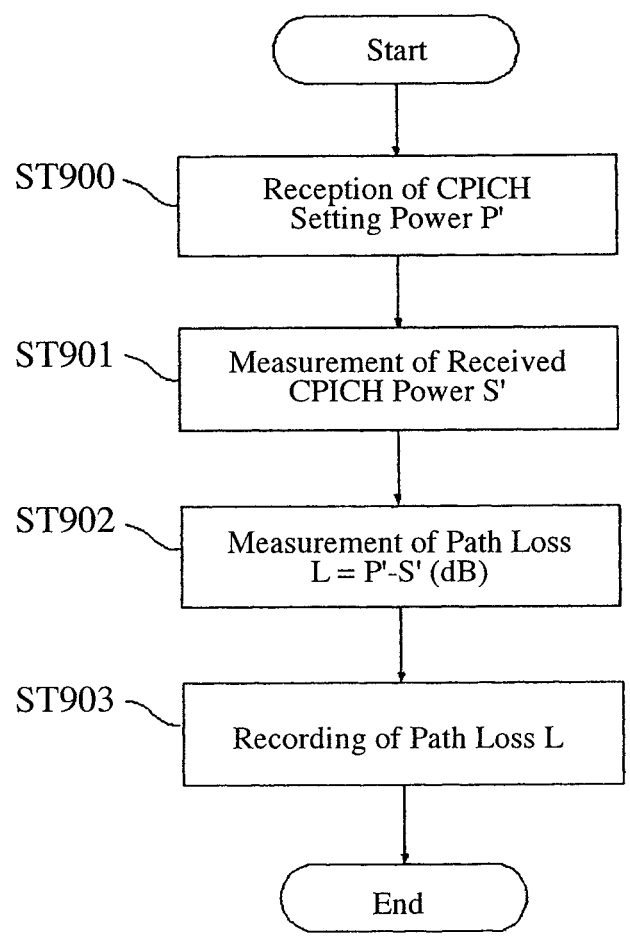
FIG. 9 is a flow chart for explaining a process of measuring the path loss in the mobile station.

FIG. 9 is a flow chart for explaining a process of measuring the path loss in the mobile station. The mobile station calculates the path loss L from the difference between the setting power P' of the CPICH which the base station control apparatus has set up, and the received power S' of the CPICH signal which the mobile station has received. That is, the path-loss L (dB) is calculated from $L=P'-S'$. In FIG. 9, the mobile station reads the setting power P' (dBm) of the CPICH from the BCH signal which the broadcast information receiving unit 312 has received (step 900). The setting power P' of the CPICH is set up by the base station control apparatus, and is transmitted to the mobile station via each base station. Each base station transmits the CPICH signal with the power P' (dBm) set up by the base station control apparatus. In step 901, the CPICH receiving unit 311 of the mobile station receives the CPICH signal transmitted from each base station and also measures the power S' (dBm) of the CPICH signal which it has received. The CPICH signal transmitted with the power P' (dBm) from each base station attenuates and then has the power S' by the time when it is received by the mobile station. The decrease in the power which the CPICH signal has undergone during traveling the propagation path by the time it reaches the mobile station is the path loss. In step 902, the mobile station defines the difference between the setting power P' of the CPICH signal and the power S' of the CPICH signal which it has actually received as the path loss L in order to calculate the path loss L. In step 903, the mobile station then records the path loss L which it has calculated into the path-loss management unit 317.

Through the above-mentioned processing, the mobile station grasps the path loss L of each base station from the difference between the setting power of the CPICH and the received power of the CPICH, and the amount I of interference in each base station. Hereafter, the process of estimating the signal power from the mobile station which each base station has received (referred to as uplink signal received power from here on) on the basis of the path loss L will be explained with reference to FIG. 5. Assume that the mobile station 100 transmits signals with the transmit power P (dBm). The mobile station 100 defines the smallest path loss among the path losses currently being recorded into the path-loss management unit 317 as a reference path loss L0. Next, the mobile station estimates uplink reference signal received power S0 (dBm), which is used as a reference, from the reference path loss L0 and the transmit power P thereof. The uplink reference signal received power S0 means the signal power from the mobile station which is measured by a base station 101b having the smallest path loss. That is, because the signal power (transmit power P) transmitted from the mobile station 100 attenuates by only the reference path loss L0 by the time when it reaches the base station 101b, the uplink reference signal received power S0 (dBm) is determined as the difference between the transmit power P and the reference path loss L0. Through the above-mentioned processing, the uplink signal reference received power in the base station 101b with the reference path loss L0 is estimated. The mobile station 100, by using the uplink signal reference received power S0 which it has calculated as mentioned above, calculates the uplink signal received power S of the base station 101a which estimates the uplink signal received power S in the base station 101a with the path loss L from $S=S0-(L-L0)$ because it can be considered that the uplink signal received power S decreases from the uplink signal reference received power S0 in the base station 101b by the path-loss difference $L-L0$. As mentioned above, the mobile station measures the uplink signal received power of each of all the base stations included in the current active set.

Figure 10:
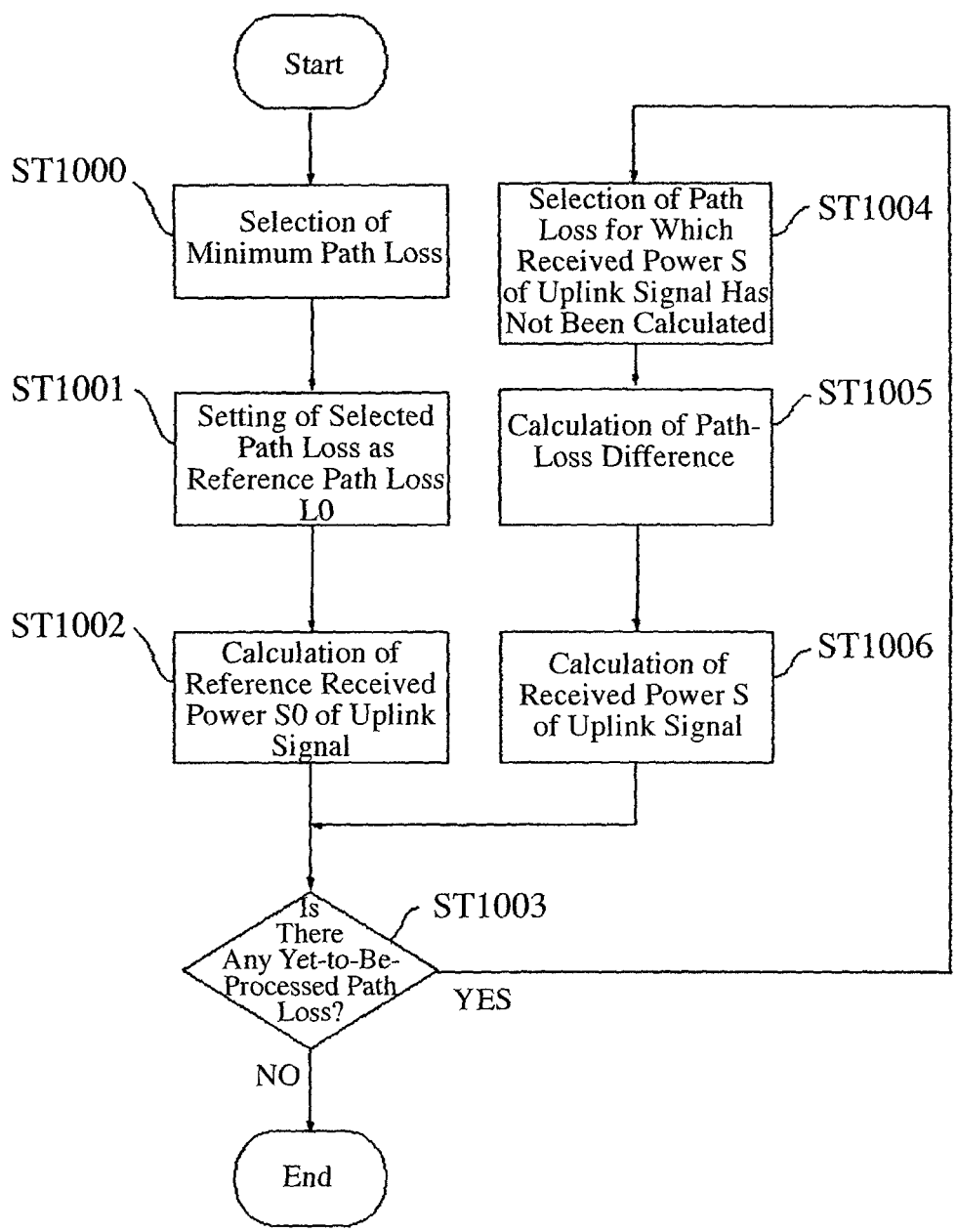
FIG. 10 is a flow chart explaining the process of estimating uplink signal received power.

FIG. 10 is a flow chart explaining the process of estimating the uplink signal received power. In FIG. 10, the SIR control unit 315 of the mobile station selects the smallest path loss L among the path losses of all the base stations currently being recorded into the path-loss management unit 317 (step 1000). The SIR control unit 315 then defines the smallest path loss which it has selected in step 1000 as the reference path loss L0 (step 1001). Next, the calculating unit 316 defines (the power P−L0) which it has obtained by subtracting the reference path loss L0 from the transmit power P of the transmit power amplifying unit 307 as the uplink signal reference received power S0 (step 1002). The SIR control unit 315 judges whether there is any path loss for which no uplink signal received power S has been calculated (step 1003). If there is no path loss for which no uplink signal received power S has been calculated (if No in Step 1003), the SIR control unit stops the processing. If there is a path loss for which no uplink signal received power S has been calculated (if Yes in step 1003), the SIR control unit 315, in step 1004, select a path loss L for which no uplink signal received power S has been calculated. The calculating unit 316 calculates the difference (L−L0) between the path loss L selected in step 1004 and the reference path loss L0 (step 1005). The calculating unit 316 subtracts the path-loss difference (L−L0) calculated in step 1005 from the uplink signal reference received power S0 so as to calculate the uplink signal received power S in a base station with the selected path loss L (step 1006). After the calculating unit has performed the above-mentioned process, the SIR control unit, in step 1003, judges whether there is any path loss for which no uplink signal received power S has been calculated. The processes of steps 1004 to 1006 are repeated until there is no further path loss for which no uplink signal received power S has been calculated (until No is answered in step 1003).

The mobile station can estimate the uplink signal received power in each base station which is performing a soft handover by carrying out the uplink signal received power estimation process shown in FIG. 10 (for example, the mobile station can estimate S1 to S3 when communicating with three base stations). The mobile station grasps the amount of interference in each base station (I1 to I3) from the broadcast signal broadcasted thereto using the BCH from each base station. The mobile station can calculate the SIRs (SIR1 to SIR3) of the base stations which are carrying out a soft handover from these amounts of interference (I1 to I3) and the uplink signal received powers (S1 to S3). Because the uplink signal received power estimated through the processing shown in FIG. 10 is nothing but the received power in each base station which is estimated by the mobile station, the SIR calculated from both the amount of interference and the uplink signal received power which is estimated by the mobile station is only a pseudo one. Therefore, in the following explanation, the SIR is referred to as "SIR-equivalent value" or "pseudo SIR." Because the SIR is the ratio of the received power to the interference power in each base station, for example, the SIR1 is calculated by using the following equation: SIR1=S1/I1.

The pseudo SIR (SIR2, SIR3, or . . . ) of each base station can be similarly calculated.

By calculating the pseudo SIRs (SIR1 to SIR3) of the base stations in the above-mentioned way, the mobile station can rank the plurality of base stations which are carrying out a soft handover on the basis of the pseudo SIRs in descending order of the uplink communication quality. Therefore, even under circumstances where a link imbalance occurs and therefore the mobile station cannot estimate the uplink communication quality from the downlink communication quality, the mobile station can select a base station with the best uplink communication quality which is suitable for setting up the E-DCH. Furthermore, because the mobile station can rank the uplink channels of the plurality of base stations in descending order of the communication quality, even when the downlink with the base station with the best uplink communication quality does not satisfy certain communication quality under circumstances where a link imbalance occurs, the mobile station can select a base station with the second best uplink communication quality. In addition, by judging the uplink communication quality on the basis of the pseudo SIR in the above-mentioned way, the mobile station can obtain a high-precision judgment result rather than the result of the judgment of the uplink communication quality from the TPC command.

Embodiment 2

In accordance with embodiment 1, each base station broadcasts the amount I of interference to the mobile station using the BCH. As an alternative, each base station can broadcast the amount I of interference to the mobile station using a channel other than the BCH. Hereafter, an example in which each base station notifies the amount of interference using a channel other than the BCH will be explained. Concretely, an AG (Absolute Grant), an RG (Relative Grant), an over load, or the like can be provided as information associated with the amount of interference. Grant is notification of grant which is provided from a scheduler to the mobile station. The AG is a channel signal showing an absolute rate at which a plurality of bits are transmitted every 10 ms, and is piggybacked onto an E-AGCH (E-DCH Absolute Grant Channel). The RG is a channel signal in which one bit is transmitted every 2 ms or 10 ms in order to move a point relatively from the absolute value notified via the AG. The RG is piggybacked onto an E-RGCH (E-DCH Relative Grant Channel). In the following explanation, assume that an AG means a mechanism for using a channel onto which the AG is piggybacked, and an ID. Furthermore, assume that an RG includes a mechanism for using a channel onto which the RG is piggybacked and an ID, like the AG. The channel onto which ACK/NACK of E-DCH is piggybacked is an E-HICH (E-DCH ACK Indicator Channel).

The E-HICH is also a channel via which one bit is transmitted every 2 ms or 10 ms, like the E-RGCH, and is distinguishable from the E-RGCH with an Hadamard code. Therefore, an E-RGCH signal and an E-HICH signal can be multiplexed using an identical channelization code.

An example in the case of using an AG will be shown below. In the case of using an AG, an individual identification number (ID) is assigned to the mobile station, and can be set as the destination identification number. This ID can be alternatively set up in common to a plurality of mobile stations so that the same information can be sent simultaneously to the plurality of mobile stations. This ID can also be used for distinguishing pieces of information in addition to the identification of each mobile station, and, by transmitting an AG with an different ID to an identical mobile station, the amount of interference of each base station and so on, other than the absolute Grant which should be originally transmitted to the mobile station, can also be transmitted to the mobile station. FIG. 11 is a flow chart explaining a process which is performed by the mobile station when the amount of interference is broadcasted thereto from a base station using an AG. A different ID is provided according to the description of the process. In step 1100, the mobile station receives a signal via a physical channel (E-AGCH) onto which an AG is piggybacked. In step 1101, the mobile station carries out demapping of the signal received via the physical channel. In step 1102, the mobile station carries out rate dematching of the signal received via the physical channel. In step 1103, the mobile station carries out channel decoding of the signal received via the physical channel. After step 1104, the mobile station carries out processes corresponding to the ID1 to ID3. In multiplication of the signal by a UEID of step 1104, the mobile station multiplies it by a CRC (Cyclic Redundancy Check) currently assigned to the ID. In CRC check of step 1105, the mobile station judges whether the signal has been decoded correctly after the multiplication of the signal by the UEID of step 1104, and, when judging that it has been not decoded correctly, abandons it in step 1106. In contrast, when, instep 1107, judging that it has been decoded correctly, the mobile station hands over the value acquired as the output to the interference amount bit management unit 322. As shown in FIG. 11, by processing two or more IDs, the mobile station can also receive different information therewithin.

FIG. 12 is an explanatory diagram showing an outline of a system showing a method of using group IDs. A group ID indicates a common ID assigned to a plurality of mobile stations. In FIG. 12, mobile stations 1200a to 1200c are the transceivers of users to whom ID=1 is assigned. The base station 1201 is a base station which serves as a serving cell. The base station which is the serving cell is the one which has a dominant role in the scheduling. E-AGCHs 1201a to 1201c are channels for transmitting AGs. As shown in FIG. 12, all the mobile stations 1200a to 1200c to which the group ID=1 is assigned can receive the same information. FIG. 13 is an explanatory diagram for explaining a system which notifies the amount of interference using an AG. The following plural group IDs: ID=1, ID=2, ID=3, an ID=4 are assigned to a mobile station 1300. Each of base stations 1301a to 1301c measures the amount of interference in the cell thereof. The base station 1301a is a serving cell, and the base stations 1301b and 1301c are non-serving cells. Once the amount of interference measured by each of the base stations 1301a to 1301c is sent to a base station control apparatus 1303, they are collected by the base station control apparatus 1303 and are notified from the base station 1301a to the mobile station 1300 using an E-AGCH 1302 including various pieces of information about ID1 to ID4. The pieces of information which are collected by the base station control apparatus 1303 and are then notified to the mobile station 1300 can be distinguished from one another with ID1 to ID4. In the case of using an AG, because two or more amounts of interference can be piggybacked onto one channel, there is an advantage of providing only one AG receiving apparatus in each UE.

Embodiment 3

An example of using an RG in order to notify the amount of interference from a base station to a mobile station will be explained hereafter. Also in the case of using an RG, an individual ID is set o each mobile station as in the case of using an AG. Furthermore, a group ID can also be used even in the case of using an RG. In the case of using an RG, orthogonal codes which are called Hadamard codes are used without using CRC in order to distinguish IDs from one another, unlike as in the case of using an AG. Because there is no CRC bit in an RG and IDs are distinguished from one another with Hadamard codes, it is difficult for each mobile station to judge whether an RG has been sent thereto compared with the case of using an AG. For this reason, it is desirable that RGs are always sent to mobile stations. FIG. 14 is a flow chart for explaining a process which is performed by a mobile station when the amount of interference is broadcasted thereto from a base station using an RG. An ID which differs according to the description of the process is disposed. In step 1400, the mobile station receives a physical channel (E-RGCH) signal onto which an RG is piggybacked. In each of steps 1401a to 1401c, the mobile station returns to the signal to an original signal which is yet to be spread by multiplying it by an Hadamard code which is the same as the Hadamard code (UEID) by which the signal was multiplied at the time when spread. In the case of using an RG, an Hadamard code is used as an UEID. When the signal is multiplied by a different Hadamard code, there is no correlation with the original sequence and the output is not determined. In each of steps 1402a to 1402c, the mobile station carries out demapping of the received physical channel signal. In each of steps 1403a to 1403c, the mobile station carries out channel decoding of the received physical channel signal. In the case of using an RG, the mobile station codes the received physical channel signal with a Reed-Muller code (8, 5), as in the case of, for example, a TICH which complies with R99. The coding with a Reed-Muller code does not need rate matching. In steps 1404a to 1404c, the mobile station can acquire, as its output, an RG Grant for the base station ID1, and can acquire, as its output, an ACK/NACK for the base station ID2, and can acquire, as its output, the amount of interference of the base station for the base station ID3.

As shown in FIG. 14, the mobile station can receive different information also therewithin by processing two or more group IDs. As an alternative, the mobile station can use a method of, when not transmitting any ACK/NACK, transmitting the amount of interference. In this case, there is an advantage of being able to use an E-HICH onto which ACK/NACK is piggybacked when no ACK/NACK is transmitted. Furthermore, the mobile station can estimate that ACK/NACK will come certainly when carrying out E-DCH transmission. Therefore, when any ACK/NACK does not come, the mobile station can recognize that the amount of interference is piggybacked onto the E-HICH. For this reason, the mobile station has only to carry out the switching at the time when receiving ACK/NACK. In the case in which the E-RGCH is used as the channel onto which the amount of interference is piggybacked, an Hadamard code is required for each of the RG, the amount of interference, and ACK/NACK, whereas in the case in which the amount of interference is transmitted when no ACK/NACK is transmitted, there is an advantage of simply assigning an Hadamard code to each of the RG and the E-HICH. Also in the case of using an RG, information can be transmitted using a group ID, as in the case of using an AG.

Figure 15:
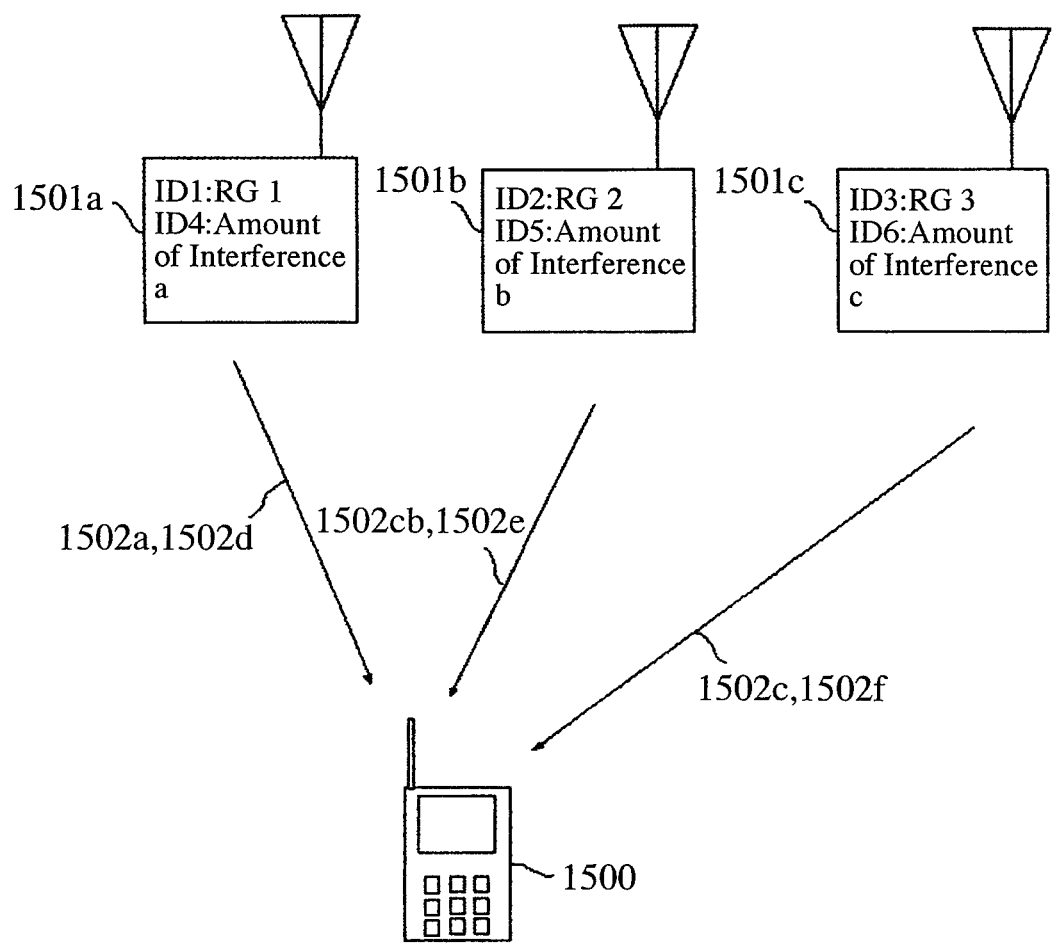
FIG. 15 is an explanatory diagram explaining a system which notifies the amount of interference using an RG.
Figure 16:
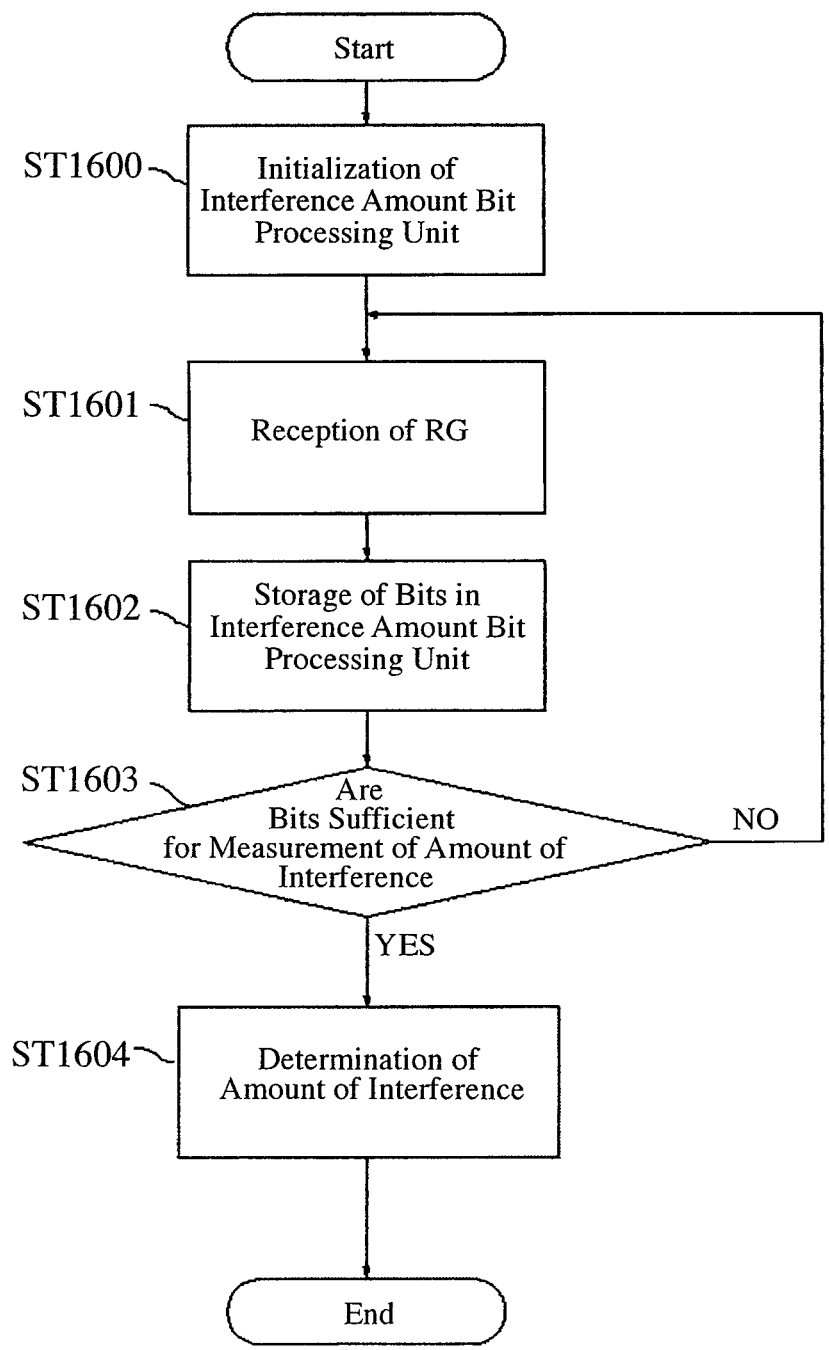
FIG. 16 is a flowchart explaining a process of measures the amount of interference using an E-RGCH.

FIG. 15 is an explanatory diagram explaining a system which notifies the amount of interference using an RG. In FIG. 15, ID=1, ID=2, ID=3, ID=4, ID=5, and ID=6 are assigned to a mobile station 1500. Each base station 1501 is a base station which measures the amount of interference, and uses an E-RGCH (RG) 1502 to transmit information indicating the amount of interference to the mobile station. A base station 1501a is a serving cell, and other base stations are non serving cells. Each information is distinguished by an ID. The base station of the 2101a serving cell can also use an E-AGCH instead of the 2102 E-RGCH. When the E-RGCH is used, there is a premise that an RG has a duration of 2 ms and consists of 1 bit, and, for example, each base station waits for 10 ms to notify the amount of interference to the mobile station in units of 5 bits. FIG. 16 is a flow chart explaining a process of measuring the amount of interference using the E-RGCH. In step 1600, the mobile station initializes the interference amount bit processing unit 322 for storing bits indicating the amount of interference, and makes preparations in order to newly measure the amount of interference. In step 1601, the mobile station receives an RG onto which bits indicating the amount of interference are piggybacked. In step 1602, the mobile station stores the received bits indicating the amount of interference in the interference amount bit processing unit 322. The mobile station then, in step 1603, judges whether it has received bits sufficient for the measurement of the amount of interference. When the mobile station has received bits required for the measurement of the amount of interference (if Yes in step 1604), the mobile station carries out step 1604. In contrast, when the mobile station has not received bits required for the measurement of the amount of interference (if No in step 1604), the mobile station repeats the processes of step 1601 and subsequent steps. In step 1604, the mobile station decodes the bits currently being stored in the interference amount bit processing unit 322 so as to acquire the amount of interference. As previously explained, because in the case of using an RG, each base station can notify the amount of interference directly to the mobile station without sending it via any base station control apparatus, each base station can transmit the amount of interference to the mobile station in a quicker time as compared with the case of using an AG.

Embodiment 4

An example in which each base station uses an overload identifier (also referred to as a busy bit) in order to notify the amount of interference to a mobile station will be explained. The overload identifier is information indicating whether the amount of interference of a target base station is large or small, and 1 bit is used as the overload identifier. When this bit is set, the mobile station limits transmission via an E-DCH. For example, overload=1 when the amount of interference is large. It can be considered that, for example, the overload identifier is piggybacked onto an E-RGCH, like an RG. In this case, the overload identifier is decoded as shown in FIG. 14, like an RG. It can also be considered that, instead of the E-RGCH, a common channel can also be used in the transmission of the overload identifier.

Figure 17:
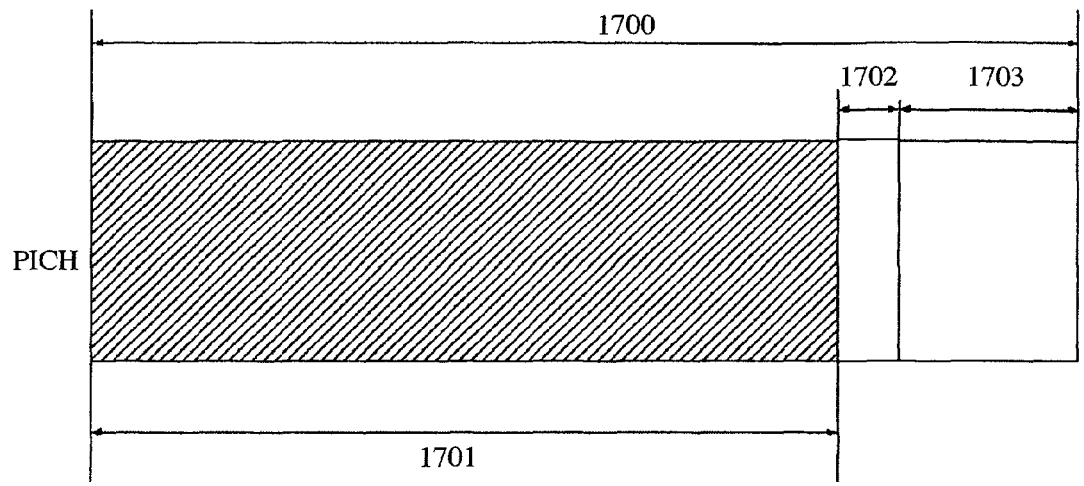
FIG. 17 is an explanatory diagram showing the structure of a pilot channel onto which an overload identifier is piggybacked.

An example in which the overload identifier is piggybacked onto the common channel will be shown below. Because only one overload identifier has only to be provided for each base station, a prior art paging indicator channel (PICH) can also be used. In particular, the overload identifier can be piggybacked onto a blank bit of the paging indicator channel. FIG. 17 is an explanatory diagram showing the structure of the paging indicator channel onto which the overload identifier is piggybacked. In FIG. 17, bits 1700 in one frame show the number of bits in one frame in the paging indicator channel, and it is defined in R99 that the number of the bits is 300 bits. Bits 1701 in use are bits currently being used according to R99, and it is defined in R99 that the number of the bits is 288 bits. An overload 1702 is one bit which is used for the Overload Indicator. This portion is an unassigned bit in R99. Unassigned bits 1703 are not used also in both R99 and release 6, and the number of the bits is 11 bits.

Next, a method of transmitting the Overload Indicator with two or more bits will be explained. Because a paging indicator channel is a channel via which a signal is transmitted without being protected as a physical layer, an error easily occurs when only 1 bit is used to transmit the Overload Indicator. Therefore, a method of transmitting the Overload Indicator in the case of using two or more Overload bits 1702. In order to avoid the influence of errors, it is desirable that the mobile station receives two or more bits and averages their values. It is desirable that at that time, the mobile station, instead of carrying out a hard decision of each received bit as a binary value, continuously integrates the two or more bits having a multiple value so as to carry out a soft decision of the integrated result. By making the two or more bits continuously appear at the location of the bit which means the Overload, the continuous integration can be implemented. As a method highly compatible with the prior art method, a method of assuming an identifier (Indicator) of the prior art paging indicator channel as something that means the overload (Overload) is also considered. In this case, cycle parameters which determine the timing at which paging indicator channel data should be read are changed and two paging indicator channel data are read so that an indicator for prior art paging and an indicator for Overload are distinguished from each other.

Next, a method of transmitting the amount of interference with a blank bit of the paging indicator channel will be explained. As a method of improving the resolution of the notification, there is the method of equally assigning 12 bits to the amount of interference. However, a reception error which occurs in high-order bits of the amount of interference may cause a malfunction in the mobile station. Therefore, the mobile station is allowed to make an error correction using a Reed-Muller (Reed-Muller) code or the like. For example, in the case of notification of the amount of interference of two or more bits (these two or more bits may be called a Cell load Indicator), for example, the Cell load Indicator consists of 4 bits, and, when it is allocated to part of 12 blank bits, a (12, 4) code can be used.

Figure 18:
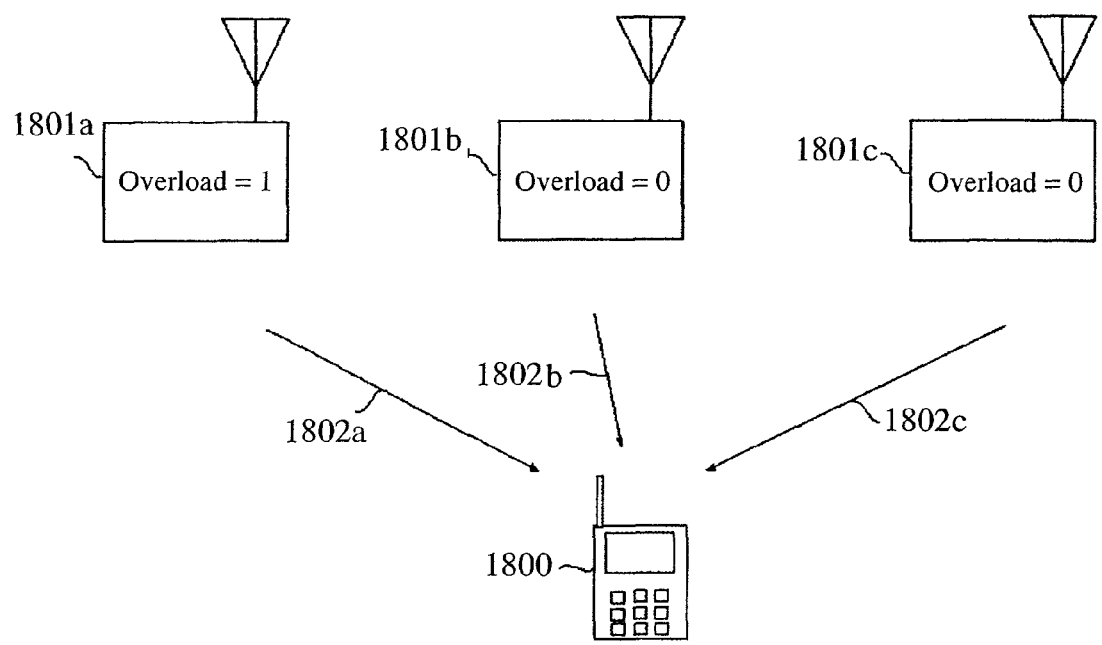
FIG. 18 is an explanatory diagram explaining a system which notifies the amount of interference using an Overload Indicator.
Figure 19:
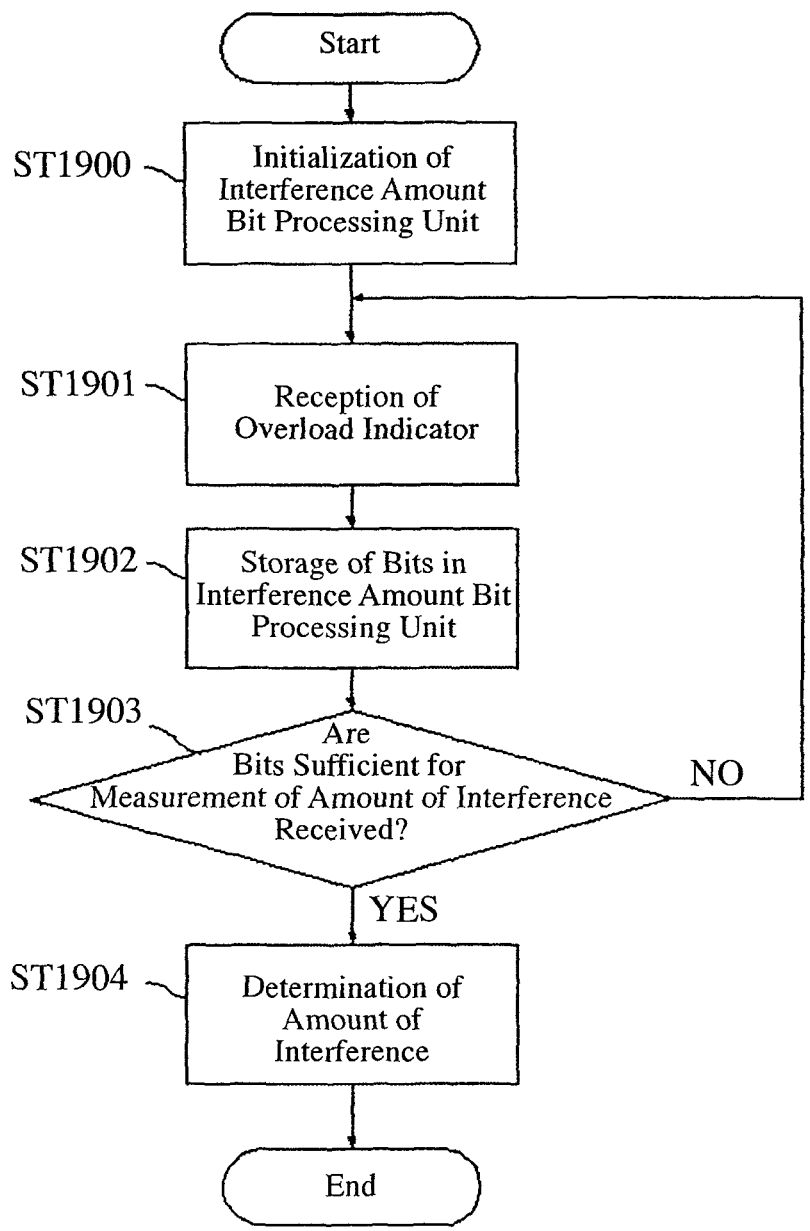
FIG. 19 is a flow chart explaining a process of measuring the amount of interference using an Overload Indicator.

FIG. 18 is an explanatory diagram explaining a system which notifies the amount of interference using an Overload Indicator. ID=1 is assigned to a mobile station 1800. Each of base stations 1801a to 1801c is a base station which measures the amount of interference, and outputs an overload identifier (Overload) having a value 1 or 0 according to whether the amount of interference is large or small. Each of notifications 1802a to 1802c of Overload is made to transmit the value of the Overload to the mobile station 1800. FIG. 19 is a flow chart explaining a process of measuring the amount of interference using an Overload Indicator. In step 1900, the mobile station initializes the interference amount bit processing unit 322 which stores bits indicating the amount of interference, and makes preparations for newly measuring the amount of interference. In step 1901, the mobile station receives an RG onto which an Overload Indicator is piggybacked. In step 1902, the mobile station stores the Overload Indicator which it has received in the interference amount bit processing unit 322. In step 1903, the mobile station judges whether it has received Overload Indicators (busy bits) which are enough for the mobile station to measure the amount of interference. If, in this step, receiving a required number of Overload Indicators, the mobile station carries out step 1904, whereas unless receiving the required number of Overload Indicators, the mobile station repeats the processes of step 1901 and subsequent steps. In step 1904, the mobile station stores bits which it has received for 10 ms in the interference amount bit processing unit, and averages the values of the bits so as to calculate the amount of interference.

INDUSTRIAL APPLICABILITY

The present invention particularly relates to a mobile station which can be applied to a mobile communications system which adopts a method which complies with the W-CDMA standard.

The invention claimed is:

1. A communication quality judgment method, comprising:
   determining a path loss by using both setting power of a common pilot channel notified from a base station to a mobile station and a received power of a signal received through the common pilot channel by the mobile station;
   estimating an expected received power of an uplink signal by using both a transmit power applied by the mobile station to the uplink signal and the path loss measured in the path-loss determining, the estimated power indicating a value expected to be measured by a base station which receives the uplink signal transmitted by the mobile station; and estimating a signal-to-interference ratio (SIR) by using both an interference power notified from the base station to the mobile station and the received power of the uplink signal estimated in the received power estimation, the estimated signal-to-interference ratio indicating a value expected to be measured by the base station which receives the uplink signal transmitted by the mobile station.

2. The communication quality judgment method according to claim 1, wherein the received power estimation comprises:
selecting a reference path loss which is used as a reference from path losses of two or more base stations measured in the path-loss measuring; and
estimating reference received power of an uplink signal to be detected by the base station which corresponds to the reference path loss by using both the reference path loss and the transmit power of the mobile station.

3. The communication quality judgment method according to claim 2, wherein the SIR estimation comprises:
estimating received power of an uplink signal to be detected by each base station by using both a path-loss difference between each of the path losses of the two or more base stations and the reference path loss, and the reference received power of the uplink signal; and
estimating a SIR to be detected by the each base station by using the estimated received power of each base station and the interference power notified from each base station to the mobile station.

4. The communication quality judgment method according to claim 1, wherein the interference power is broadcast from the base station to the mobile station through a broadcast channel.

5. The communication quality judgment method according to claim 1, wherein the interference power is notified to the mobile station through a physical channel for notifying information about scheduling for a first data channel which is a large-volume packet data transmission channel set up in an uplink direction.

6. The communication quality judgment method according to claim 1, wherein the interference power is notified to the mobile station through a physical channel for notifying a result of the base station's judgment of reception of a first data channel which is a large-volume packet data transmission channel set up in an uplink direction.

7. A mobile station, comprising:
a transmitting unit configured to transmit large-volume packet data to a base station through a first data channel, and to transmit control data about the first data channel to the base station through a first control channel;
a receiving unit configured to receive scheduling information about the first data channel, results of reception of the large-volume packet data through the first data channel on base stations, and information on interference power broadcast from the base stations through a broadcast channel;
a path-loss measuring unit configured to measure a path loss on a basis of the signals from the base stations received by the receiving unit; and
a control unit configured to
estimate an expected received power of an uplink signal on a basis of both transmit power applied by the transmitting unit to the uplink signal and the path loss measured by the path-loss measuring unit, the estimated power indicating a value expected to be measured by a base station which receives the uplink signal transmitted by the mobile station,
estimate a signal-to-interference ratio on a basis of both an interference power received by the receiving unit and the estimated received power of the uplink signal, the estimated signal-to-interference ratio indicating a value expected to be measured by the base station which receives the uplink signal transmitted by the mobile station, and
select a base station, from the base stations, to set up the first data channel on a basis of the estimated signal-to-interference ratio.

8. A base station comprising:
a receiving unit configured to receive large-volume packet data transmitted from a mobile station through a first data channel, and to receive control data about the first data channel transmitted from the mobile station through a first control channel;
an interference power measurement unit configured to measure interference power; and
a transmitting unit configured to transmit, to the mobile station, scheduling information about the first data channel, a result of reception of the large-volume packet data through the first data channel, broadcast information to be broadcast through a broadcast channel, and the interference power measured by the interference power measurement unit, wherein,
the mobile station has been configured to
estimate an expected received power of an uplink signal by using both transmit power applied by the mobile station to the uplink signal and a measured path loss, the estimated power indicating a value expected to be measured by a base station which receives the uplink signal transmitted by the mobile station, and
estimate a signal-to-interference ratio by using both the interference power and the estimated received power of the uplink signal, the estimated signal-to-interference ratio indicating a value expected to be measured by the base station which receives the uplink signal transmitted by the mobile station.

9. A communications system, comprising:
a plurality of base stations; and
a mobile station, wherein,
each of the base stations comprises:
an uplink receiving unit configured to receive large-volume packet data transmitted through a first data channel in an uplink direction, and to receive control data about the first data channel transmitted through a first control channel;
an interference power measurement unit configured to measure an interference power; and
a downlink signal transmitting unit configured to transmit scheduling information about the first data channel, as a result of reception of the large-volume packet data through the first data channel, and information on the interference power measured by the interference power measurement unit, and
the mobile station comprises:
an uplink signal transmitting unit configured to transmit the large-volume packet data to the base stations through the first data channel, and to transmit the control data to the base stations through the first control channel;
a downlink signal receiving unit configured to receive the scheduling information, the result of reception, and the information on the interference power;

a path-loss measuring unit configured to measure a path loss on a basis of a signal received from the base stations by the downlink signal receiving unit; and a control unit configured to estimate an expected received power of an uplink signal on a basis of both a transmit power applied to the uplink signal by the uplink signal transmitting unit and the path loss measured by the path-loss measuring unit, the estimated power indicating a value expected to be measured by a base station which receives the uplink signal transmitted by the mobile station, estimate a signal-to-interference ratio on the basis of both the received interference power and the estimated received power, the estimated signal-to-interference ratio indicating a value expected to be measured by the base station which receives the uplink signal transmitted by the mobile station, and select a base station, from the base stations, to set up the first data channel on a basis of the estimated signal-to-interference ratio.

\* \* \* \* \*